United States Patent [19]

Takemoto et al.

[11] Patent Number: 5,347,622
[45] Date of Patent: Sep. 13, 1994

[54] DIGITAL IMAGE COMPOSITING SYSTEM AND METHOD

[75] Inventors: Sohei Takemoto, Fremont; Kenneth A. Woodhouse, Menlo Park, both of Calif.

[73] Assignee: ACCOM Inc., Menlo Park, Calif.

[21] Appl. No.: 685,291

[22] Filed: Apr. 12, 1991

[51] Int. Cl.$^5$ .............................................. G06F 15/00
[52] U.S. Cl. .................................. 395/135; 348/590; 348/586
[58] Field of Search ......................... 358/22, 182, 183; 395/134, 135; 345/4, 113, 114, 115

[56] References Cited

U.S. PATENT DOCUMENTS

| | | | |
|---|---|---|---|
| 4,357,624 | 11/1982 | Greenberg | 358/22 |
| 4,420,770 | 12/1983 | Rahman | 358/22 |
| 4,684,990 | 8/1987 | Oxley | 358/183 |
| 4,774,583 | 9/1988 | Kellar et al. | 358/22 |
| 4,827,344 | 5/1989 | Astle et al. | 358/22 |
| 4,872,056 | 10/1989 | Hicks et al. | 358/22 |
| 4,954,883 | 9/1990 | Belmares-Sarabis et al. | 358/22 |
| 5,027,213 | 6/1991 | Kamin | 358/22 |

*Primary Examiner*—Heather R. Herndon
*Attorney, Agent, or Firm*—Flehr, Hohbach, Test, Albritton & Herbert

[57] ABSTRACT

A digital image compositing system (20) has background, foreground, key and mask busses (22), (24), (26), and (28). An analog key input (30) is connected to the key and mask busses (26) and (28) through an analog/digital (A/D) converter (32) by crosspoint switches (34). Four digital D1 video signal inputs (36) are connected to the busses (22-24) through additional crosspoint switches (34). The key and mask busses (26) and (28) are respectively connected to frame stores (38) and (40). A key processing toolkit subsystem (42) is connected to the output of the frame stores (38) and (40). A compositor subsystem (44) is connected to the background and foreground busses (22) and (24) and to the output of the key processing toolkit subsystem (42). A D1 program output (46) is connected to the output of the compositor subsystem (44) on program bus (48). A D1 key output (50) is connected to the output of key processing toolkit subsystem (42) on processed key bus (52). A D1 auxiliary output (54) is connected to program bus (48), background bus (22), foreground bus (24), processed key bus (52) and mask bus (28) by crosspoint switches (56). An analog output (58) is also connected to the busses (48), (22), (24), (52) and (28) by additional crosspoint switches (56) through D/A converter (60). A microprocessor (62) is connected to provide control signals for all of the functional elements of the system (20). A control keyboard and display (64) is connected to the microprocessor at (66). The microprocessor (62) is also connected to a video editor at (68).

14 Claims, 17 Drawing Sheets

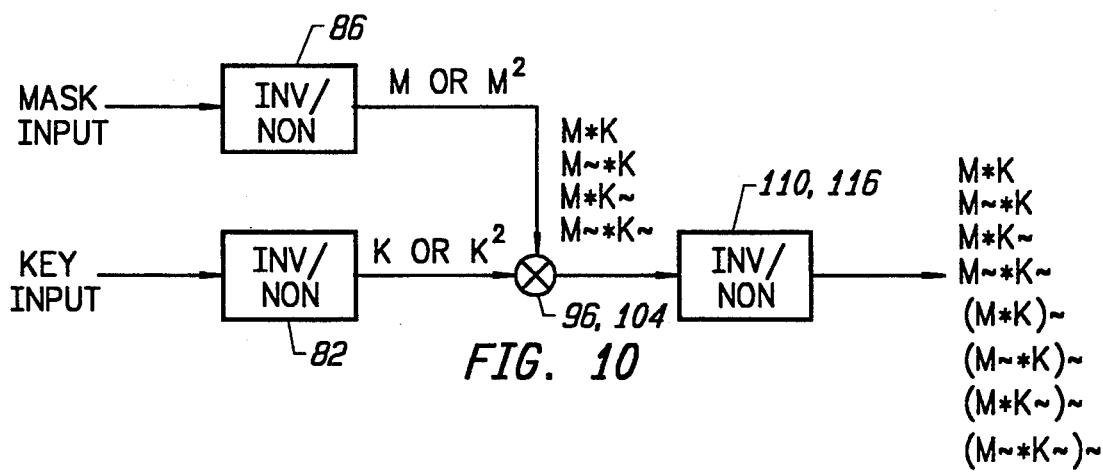

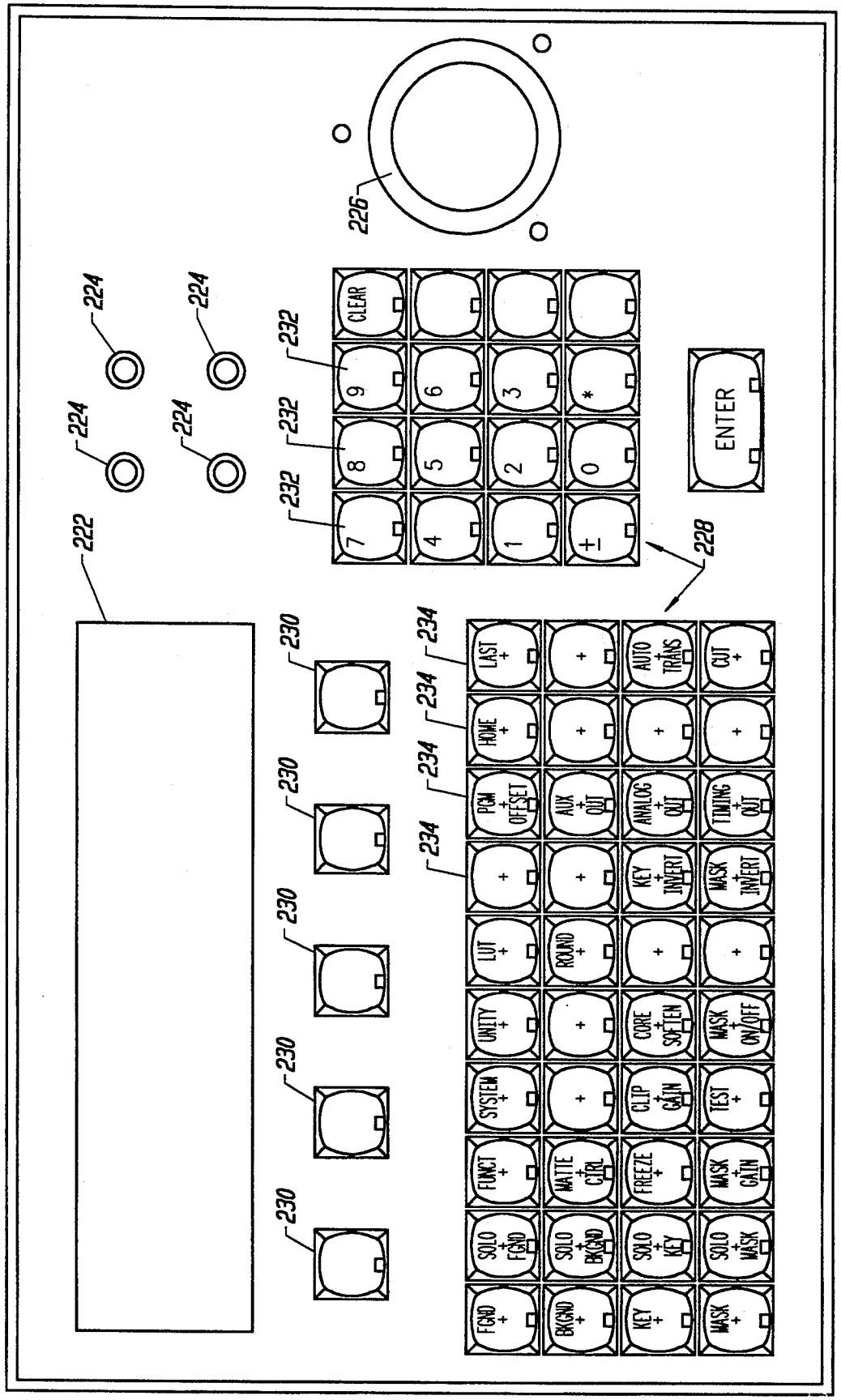

DIGITAL IMAGE COMPOSITING SYSTEM AND METHOD

BACKGROUND OF THE INVENTION

1. Field of the Invention

The present invention relates generally to digital compositing, i.e., the layering or putting together of images in a digital video domain. More particularly, it relates to a system and method for digital image compositing which gives the user an increased flexibility for such compositing. The invention further relates to a user interface that enables the user to take advantage of the increased flexibility more conveniently,

2. Description of the Prior Art

A variety of systems are known in the art for combining separate video images using a key to provide a foreground image superimposed on a background. For example, such systems are disclosed in Greenburg, U.S. Pat. No. 4,357,624 and Kellar et al., U.S. Pat. No. 4,602,286. It is further known to carry out various forms of soft edge keying to provide a realistic transition between the foreground image and the background image. One form of soft edge keying is disclosed in the Kellar et al. patent, and in Bennett et al., U.S. Pat. No. 4,463,373. Other forms of soft edge keying are disclosed in the following issued U.K patents and published U.K. patent applications: 1,178,330; 1,226,559; 1,570,773; 2,032,217; 2,092,346 and 2,109,193. In particular, one technique for soft edge keying that has particular utility is the use of sub-pixel interpolation, as disclosed in published European application 0 360 559.

Other techniques disclosed in the prior art that are useful in digital video image compositing include clock rate doubling and adaptive decimation, as disclosed in published European application 0 360 557, the use of modified keying signals to adjust boundaries between overlaid images, as disclosed in published European application 0 360 560, and the use of dynamic rounding, as disclosed in Owen, D. P., "Dynamic Rounding in Digital Video Processing," *SMPTE Journal*, June 1989, pp. 447–450.

Various forms of control interfaces for video signal processing equipment are also known in the art. For example, such interfaces are disclosed in U.S. Pat. Nos. 4,538,188; 4,763,186; 4,857,994 and 4,954,883.

While the art pertaining to digital video image compositing is thus a well-developed one, a need still remains for further improvement in such systems in order to provide improved composite images and to make such equipment easier to operate.

SUMMARY OF THE INVENTION

Accordingly, it is an object of this invention to provide a digital image compositing system and method incorporating flexible input and output crosspoint switching.

It is another object of the invention to provide such a digital image compositing system and method in which digital inputs and outputs are provided for all video signals.

It is a further object of the invention to provide such a digital image compositing system and method which will accept analog key or mask input signals.

It is still another object of the invention to provide such a digital image compositing system and method which will additionally provide any output video signal in analog form.

It is a still further object of the invention to provide such a digital image compositing system and method which can be cascaded to provide real time multiple layer compositing.

It is yet another object of the invention to provide such a digital image compositing system and method which incorporates a user interface that facilitates use of the flexibility provided by the system and method.

The attainment of these and related objects may be achieved through use of the novel digital image compositing system and method herein disclosed. A digital image compositing system in accordance with this invention has a plurality of digital video signal inputs, a key processing subsystem and a video image compositor. A first plurality of crosspoint switches connect the plurality of digital video signal inputs to the key processing subsystem and to the video image compositor. A key input is connected through the plurality of crosspoint switches to the key processing subsystem, A second plurality of crosspoint switches connect the key processing subsystem and the video image compositor to a plurality of digital video signal outputs.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 10 is a signal flow diagram representing a simplification of the signal flow portion shown in FIG. 9.

FIGS. 11A–11L are charts showing inputs to and outputs from the signal flow diagram of FIG. 10.

FIG. 16 is a plan view of a keyboard and display for use with the digital image compositing system of FIGS. 1 and 14.

DETAILED DESCRIPTION OF THE INVENTION

Figure 1:
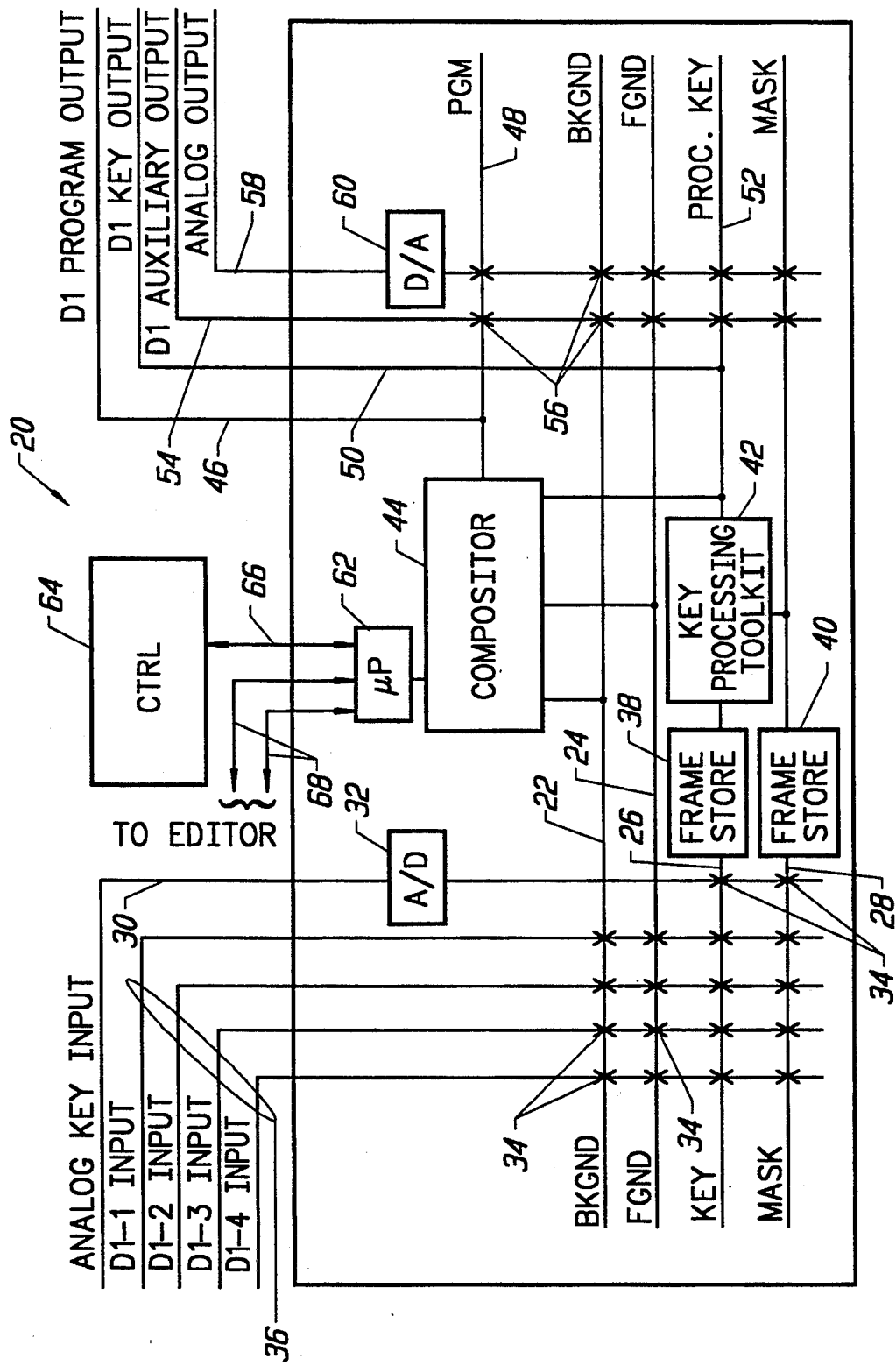
FIG. 1 is a block diagram of a digital image compositing system in accordance with the invention.

Turning now to the drawings, more particularly to FIG. 1, there is shown a digital image compositing system 20 having background, foreground, key and mask busses 22, 24, 26, and 28. An analog key input 30 is connected to the key and mask busses 26 and 28 through an analog/digital (A/D) converter 32 by crosspoint switches 34. Four digital D1 video signal inputs 36 are connected to the busses 22-24 through additional crosspoint switches 34. The key and mask busses 26 and 28 are respectively connected to frame stores 38 and 40. A key processing toolkit subsystem 42 is connected to the output of the frame stores 38 and 40. A compositor subsystem 44 is connected to the background and foreground busses 22 and 24 and to the output of the key processing toolkit subsystem 42. A D1 program output 46 is connected to the output of the compositor subsystem 44 on program bus 48. A D1 key output 50 is connected to the output of key processing toolkit subsystem 42 on processed key bus 52. A D1 auxiliary output 54 is connected to program bus 48, background bus 22, foreground bus 24, processed key bus 52 and mask bus 28 by crosspoint switches 56. An analog output 58 is also connected to the busses 48, 22, 24, 52 and 28 by additional crosspoint switches 56 through D/A converter 60. A microprocessor 62 is connected to provide control signals for all of the functional elements of the system 20. To avoid confusion in the drawing, the control connections are not shown. A control keyboard and display 64 is connected to the microprocessor at 66. The microprocessor 62 is also connected to a video editor at 68. The microprocessor 62 is desirably implemented with an NEC V50 microprocessor integrated circuit.

Figure 2:
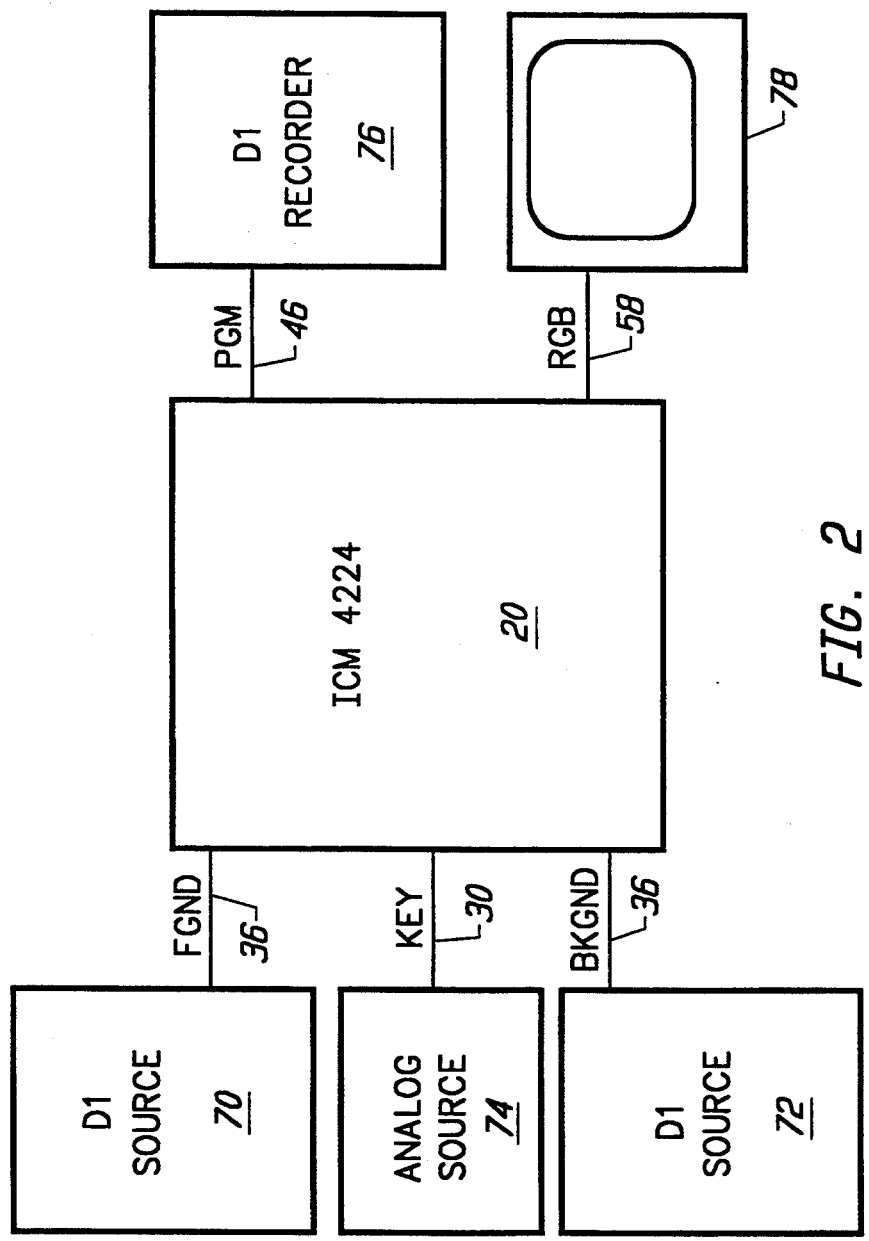
FIG. 2 is a block diagram of an editing system incorporating the digital image composition system of FIG. 1.

Under control of the microprocessor 62, the system 20 is able to accept D1 digital video signals at the inputs 36 and provide D1 digital video signals at the outputs 46, 54 and 58 in a plurality of video standards, for example, in either 525-line NTSC standard form or 625-line PAL standard form. The D1 digital video signal standard is contained in D1 Standard CCIR Recommendations Recommendation 601. The 525-line NTSC D1 digital video signal implementation is described in SMPTE Recommended Practice RP125-1984. The corresponding 625-line PAL D1 digital video signal implementation is described in EBU Parallel Interface for 625 Line Digital Video Signals, Tech. 3246-E. The system 20 processes the digital video signals at a 10-bit resolution, in order to give better resolution than the conventional 8 or 9-bit processing, FIG. 2 shows a typical application for the present invention, wherein the digital image compositing system 20 is connected to D1 digital video signal sources 70 and 72 to provide the foreground and background inputs 36 and to an analog video signal source 74 to provide the key input 30. The program output 46 is connected to a digital D1 video tape recorder (VTR) 76, and the analog output 58 is connected to a video monitor 78.

Figure 3:
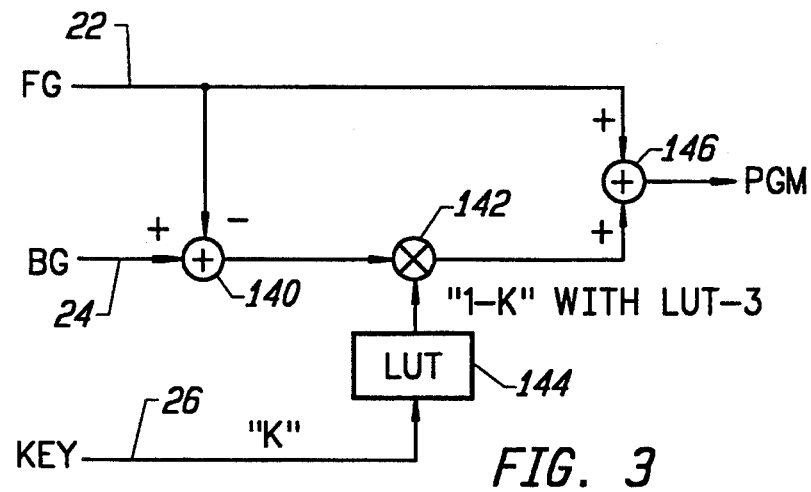
FIG. 3 is a block diagram of a portion of the digital image compositing system of FIG. 1.
Figure 4A:
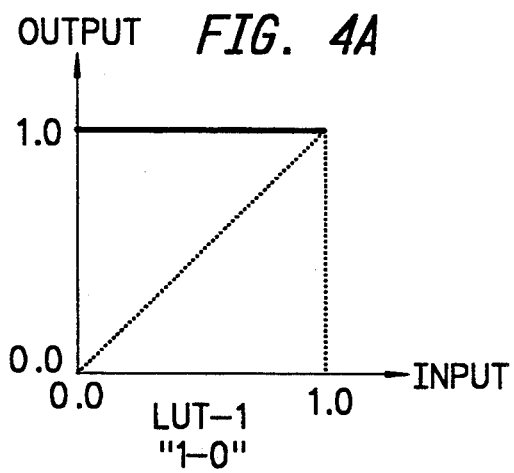
FIGS. 4A–4D are graphs showing input-output characteristics from the system portion of FIG. 3.
Figure 4B:
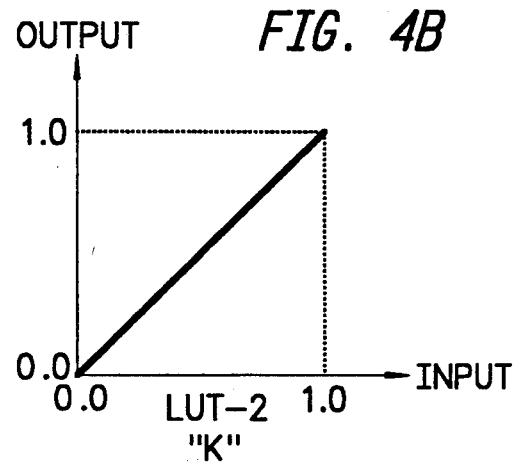
Figure 4C:
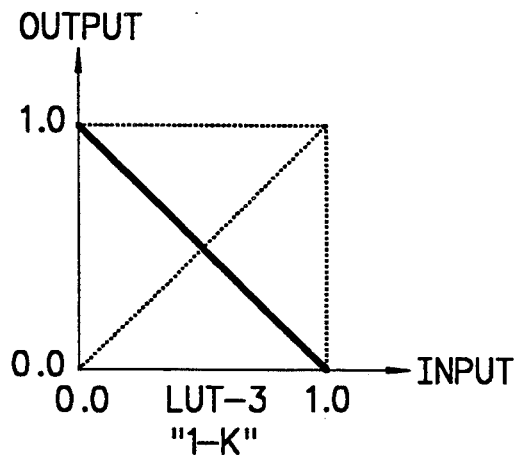
Figure 4D:
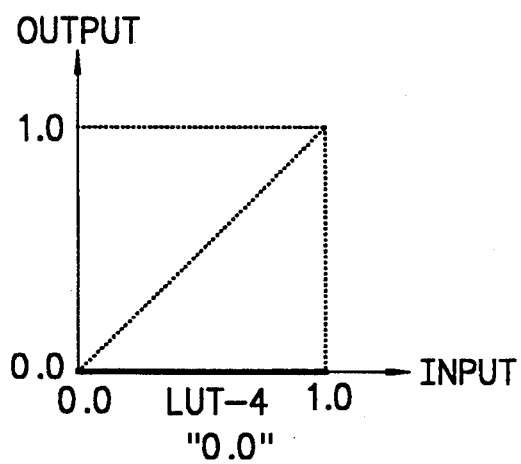
Figure 5:
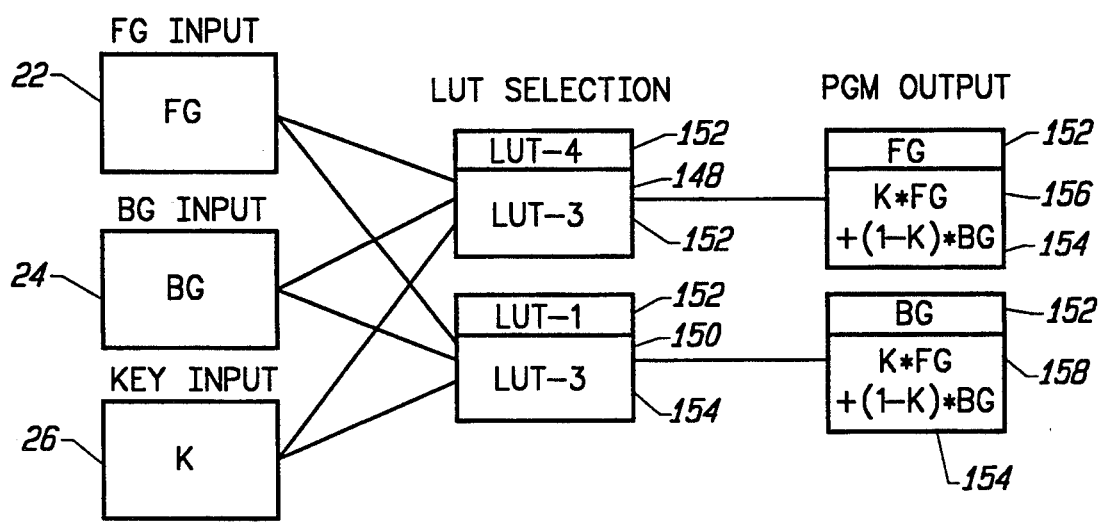
FIG. 5 is a diagram showing relations between video images and selective keying.

FIGS. 3-5 show how selective bypass/keying by timed selection of look up tables (LUTs) is implemented in the key processing toolkit subsystem 42 and in the compositor 44. The background input 24 and the foreground input 22 are supplied to a difference circuit 140. The output of the difference circuit 140 is supplied to a multiplier 142. The other input to the supplied to a multiplier 142. The other input to the multiplier 142 is supplied from look up table 144, based on the key input 26. The output of the multiplier 142 is supplied to a summing circuit 146. The other input to the summing circuit is the foreground signal 22. The output of the summing circuit 146 is the program signal. The program signal is obtained in accordance with the following formula:

$$PGM = FG + (1 - K) * (BG - FG)$$
$$= K * FG + (1 - K) * BG$$

FIGS. 4A-4D show look-up table input/output (I/O) characteristics LUT-1 through LUT-4, respectively representing outputs 1.0, K, 1-K and 0.0, stored in the look-up table 144. In FIG. 5, the foreground, background and key inputs 22, 24 and 26 represent the signal elements of a TV frame. Represented at 148 and 150 are two selections of look-up table I/O characteristics from the look-up table 144 to produce two different TV frames, each divided up into a top portion 152 and a bottom portion 154, with different look-up table characteristics selected for the portions 152 and 154, timed to produce the portions 152 and 154 during scanning of the TV frame. Shown at 156 and 158 are the resulting program output signals in the portions 152 and 154 for the two TV frames, as calculated by the above formula. In this example, the timed selection of look-up tables is used to produce different effects in separate areas of a video frame. However, the technique is not limited to separate areas, and can be used to generate a wide variety of interesting video effects.

Figure 6A:
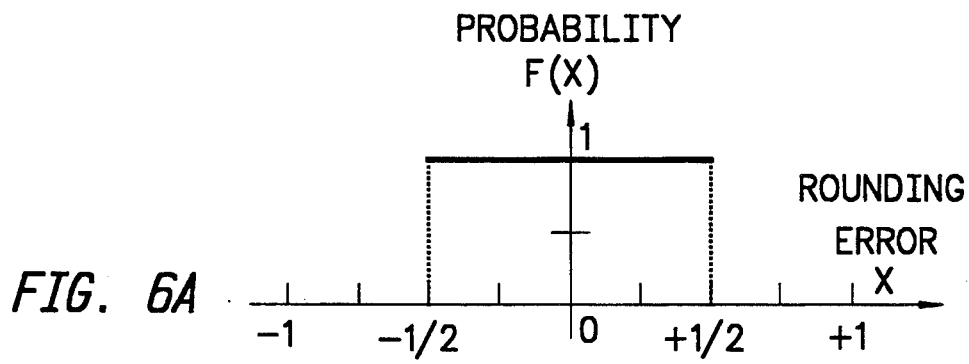
FIGS. 6A–6E are probability distribution diagrams showing different forms of signal processing in the digital image compositing system of FIG. 1.

FIGS. 6A through 6E show how variable randomized rounding is used to accommodate limited word length in video signal processing by eliminating fractional values. Rounding in accordance with the conventional rule that fractions equal to one-half or more are rounded up to the next integer and fractions of less than one-half are rounded down to the last integer yields the least variance of error, but the most noticeable false contour in the picture. The probability density function of error for rounding is shown in FIG. 6A, and is equal for all error values between $-\frac{1}{2}$ and $+\frac{1}{2}$. Dither, i.e., randomly increasing any fraction to the next digit or decreasing it to the last digit, makes false contour the least noticeable, but yields the largest variance of error by spreading the error distribution from $-1$ to $+1$. Variable randomized rounding provides selectable tradeoffs between the size of the error and the level of false contour. Depending on the magnitude of the fractional values, dithering is selectively applied. For example, 1. If the fraction is close to 0, then discard it.
2. If the fraction is close to 1, then add 1 to the integer part.
3. If the fraction is close to 0.5, then apply dither.

Figure 6B:
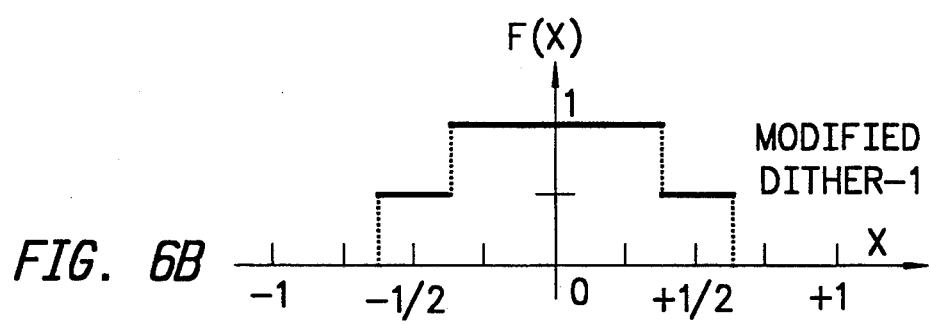
Figure 6C:
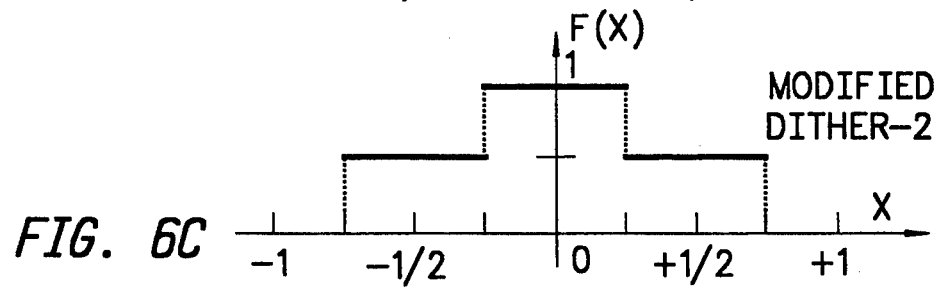
Figure 6D:
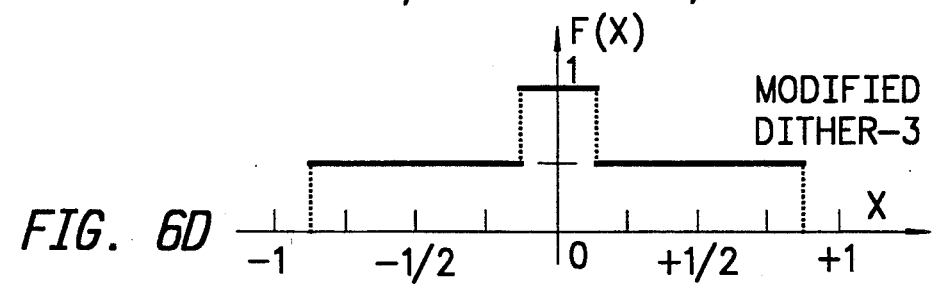
Figure 6E:
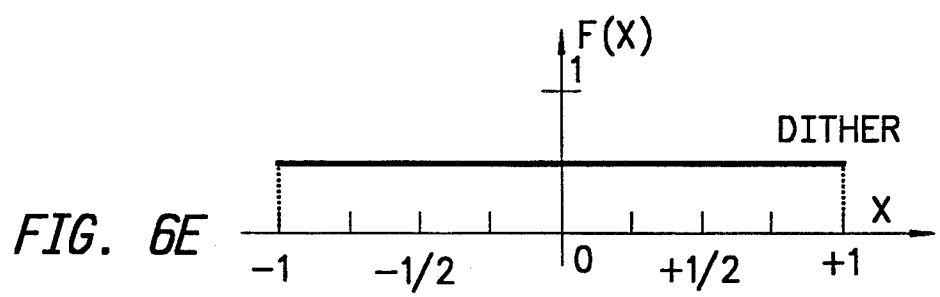

The choice of the width of the range around 0.5 in which dither is applied determines the level of randomness of the outcome. In FIG. 6B, conventional rounding is used for fractions less than $\frac{3}{8}$ or greater than $\frac{5}{8}$, with randomized rounding between those values. As shown, this decreases the probability of the greatest errors. In FIG. 6C, conventional rounding is used for fractions less than $\frac{1}{4}$ or greater than $\frac{3}{4}$, and in FIG. 6d, it is used for fractions less than $\frac{1}{8}$ or greater than $\frac{7}{8}$. The choice of which rounding mode to use is user selectable. Variable randomized rounding is applied to several points of the signal processing paths, such as at the ends of the foreground and background video processors, key processor and keying module.

Figure 7A:
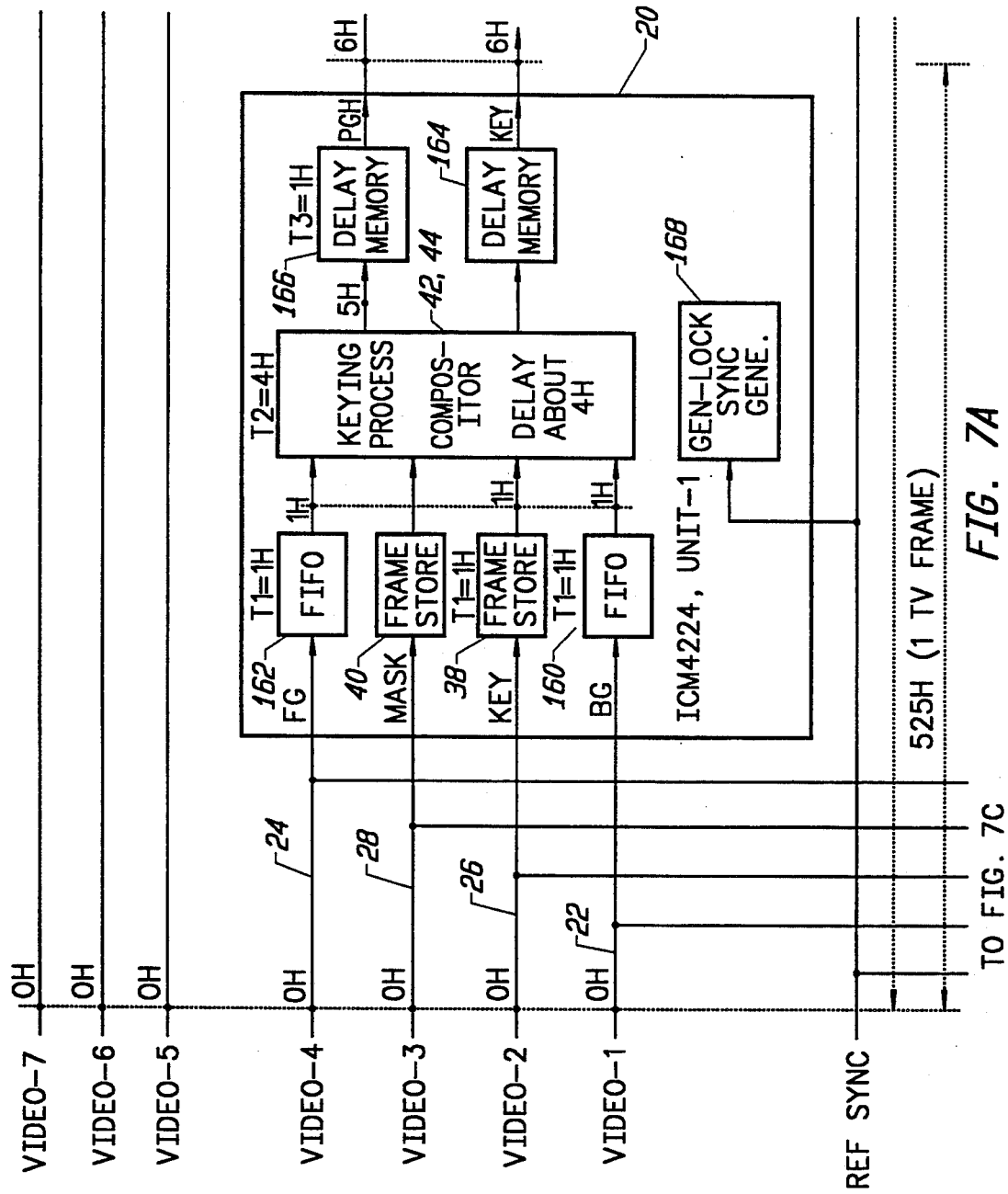
FIG. 7 is a block diagram of a video editing system incorporating a plurality of the digital image compositing systems of FIG. 1.
Figure 7B:
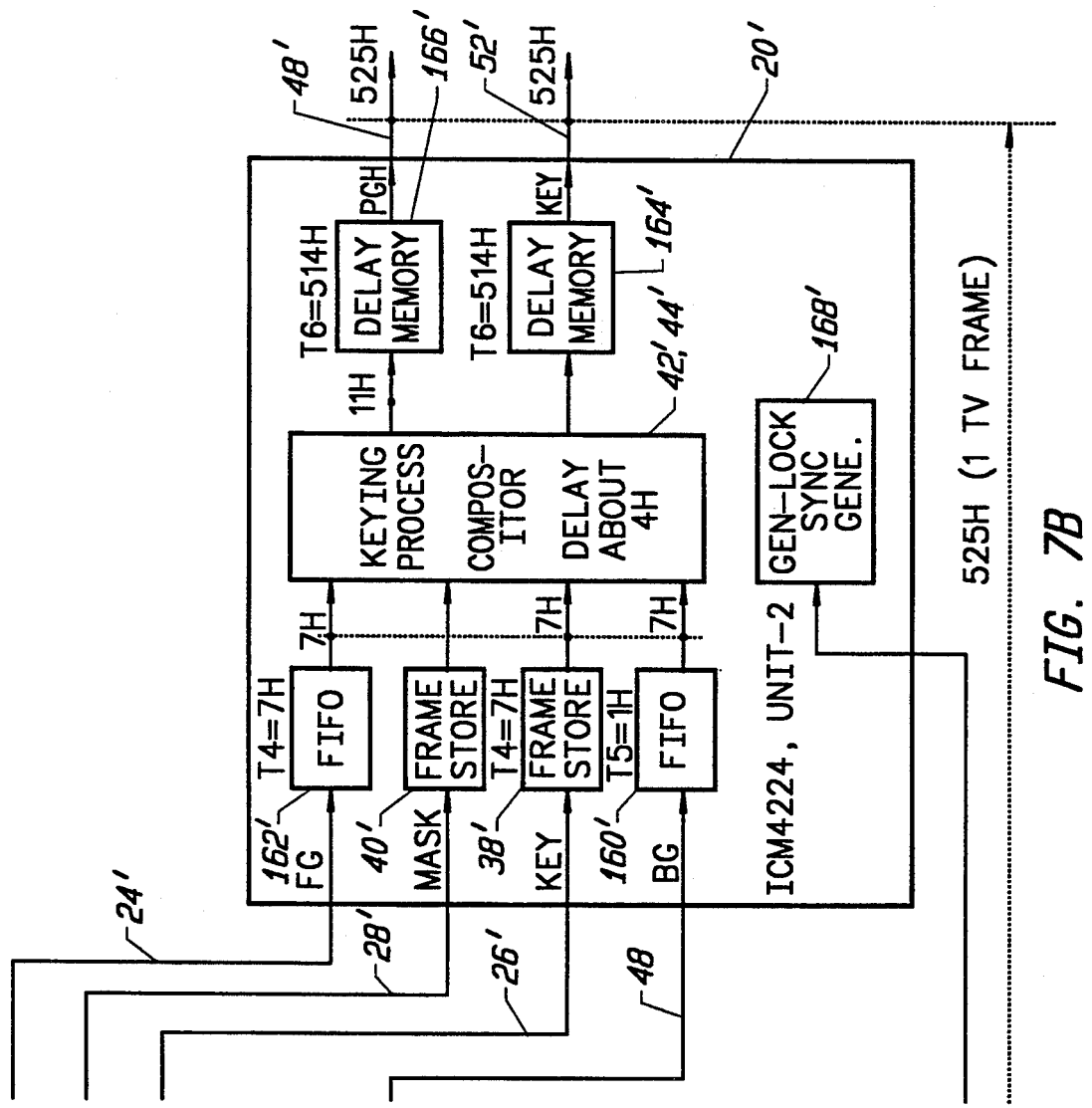
Figure 7C:
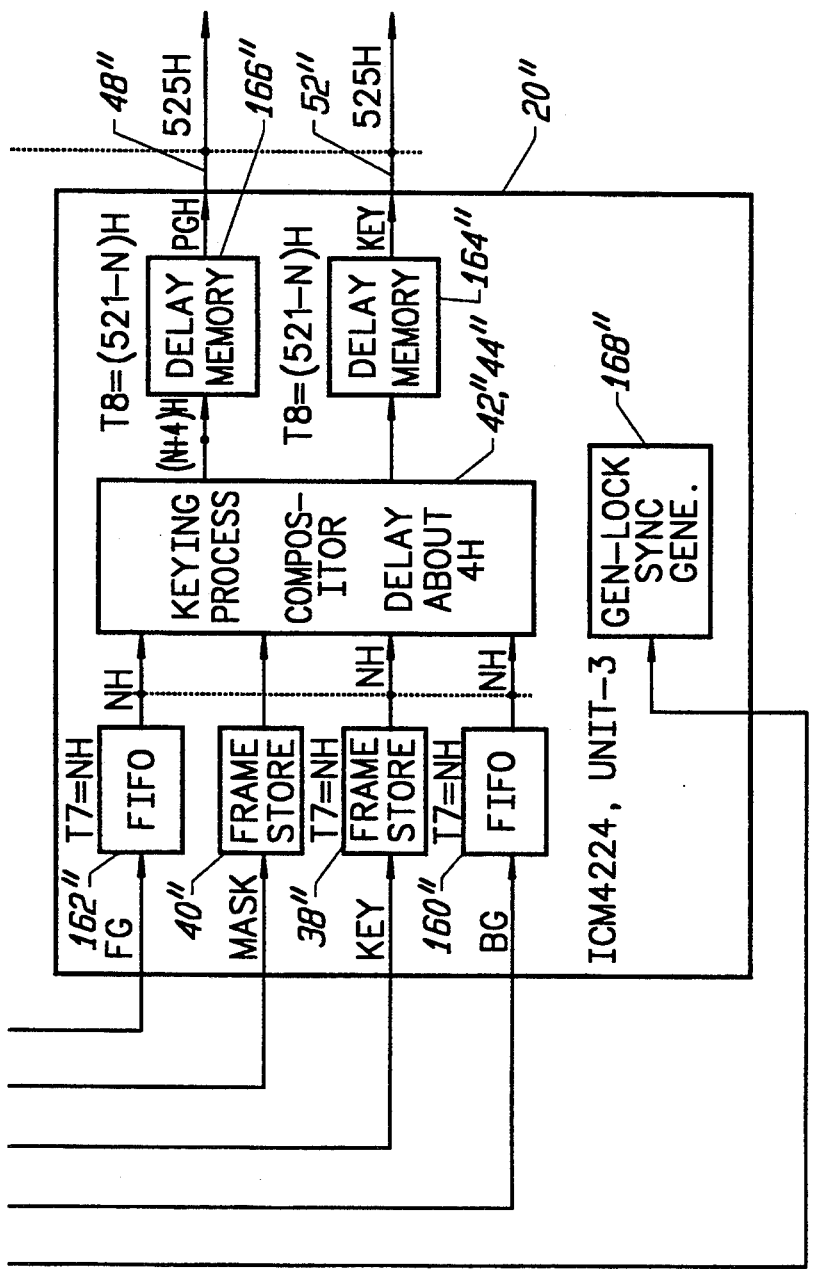

FIG. 7 shows how two or more of the video compositing systems 20, 20' can be cascaded to provide on-line multiple layering of images with a fixed overall delay of, for example, one frame. The key and mask inputs 26 and 28 are provided at a time corresponding to the beginning of the first line (1H) of a video frame to the frame stores 38 and 40. The background and foreground inputs 22 and 24 are similarly provided to first in, first out (FIFO) memories 160 and 162. The outputs of the frame stores 38 and 40 and the FIFO memories 160 and 162 are provided after a delay T1 of one line (1H) to the keying process and compositor subsystems 42, 44 for processing, which results in an additional delay T2 of four lines (4H). Program and key outputs of the keying process and compositor subsystems 42, 44 are supplied at time 5H to delay memories 164 and 166, where they undergo an additional delay T3 of one line (1H). The total delay in the compositing system 20 is thus 6H.

The program output 48 from the compositing system 20 is supplied as a background input to a 1H delay T5 FIFO memory 160' in the second compositing system 20' for a second layer of processing. Additional foreground, key and mask inputs 24', 26' and 28' are supplied to FIFO memory 162', frame store 38' and frame store 40', each of which has a 7H delay T4. The outputs of the FIFO memories 160' and 162' and the frame stores 38' and 40' thus are provided after a total delay of 7H to keying process and compositor subsystems 42',44', which have a processing delay of about 4H, supplying their program and key outputs to delay memories 164' and 166' after a total delay of 11H. The delay memories 164' and 166' add a delay T6 of 514H, giving a total delay of 525H, equal to one television frame, for the program and key outputs 48' and 52'.

If a third video compositing system 20'' is used for single level compositing, receiving the background, foreground, key and mask video inputs 22–28, respectively supplied to FIFO memories 160'' and 162'' and frame stores 38'' and 40''. In the FIFO memories 160'' and 162'' and frame stores 38'' and 40'' these inputs are supplied to the keying process and compositor subsystems 42'', 44'' after a delay T7 equal to NH, where N is arbitrary. Processing by the keying process and compositor subsystems 42'', 44'' results in a delay of about 4H, and the program and key outputs from the keying process and compositor subsystems 42'', 44'' are provided after a total delay of (N+4)H. Delay memories 164'' and 166'' provide a delay T8 equal to (521-N)H, so that the program and key outputs 48'' and 52'' from the video compositing system 20'' are provided at the same time as the program and key outputs 48' and 52' from the video compositing system 20'.

In operation, the video compositing systems 20, 20' and 20'' are synchronized by the REF SYNC signal supplied to gen-lock sync generators 168, 168' and 168''. Each of the video compositing systems 20, 20' and 20'' takes about 6H of minimum signal propagation delay. The FIFO and framestore memories 160–162 and 38–40, 160'–162' and 38'–40' and 160''–162'' and 38''–40'' at the input to each video compositing system 20, 20' and 20'' and signal delay memories 164–166, 164'–166' and 164''–166'' at the output of each system 20, 20' and 20'' allow a wide range of input and output timing adjustment. Tens of the video compositing systems can be cascaded to multiple layering, while maintaining exactly one TV frame of overall signal delay. Note that each internal video bus for the systems 20, 20' and 20'' uses different signal processing in the keying process and compositor subsystems 42, 44, 42', 44' and 42'', 44''. What is indicated in the drawings is therefore conceptual in nature.

Figure 8:
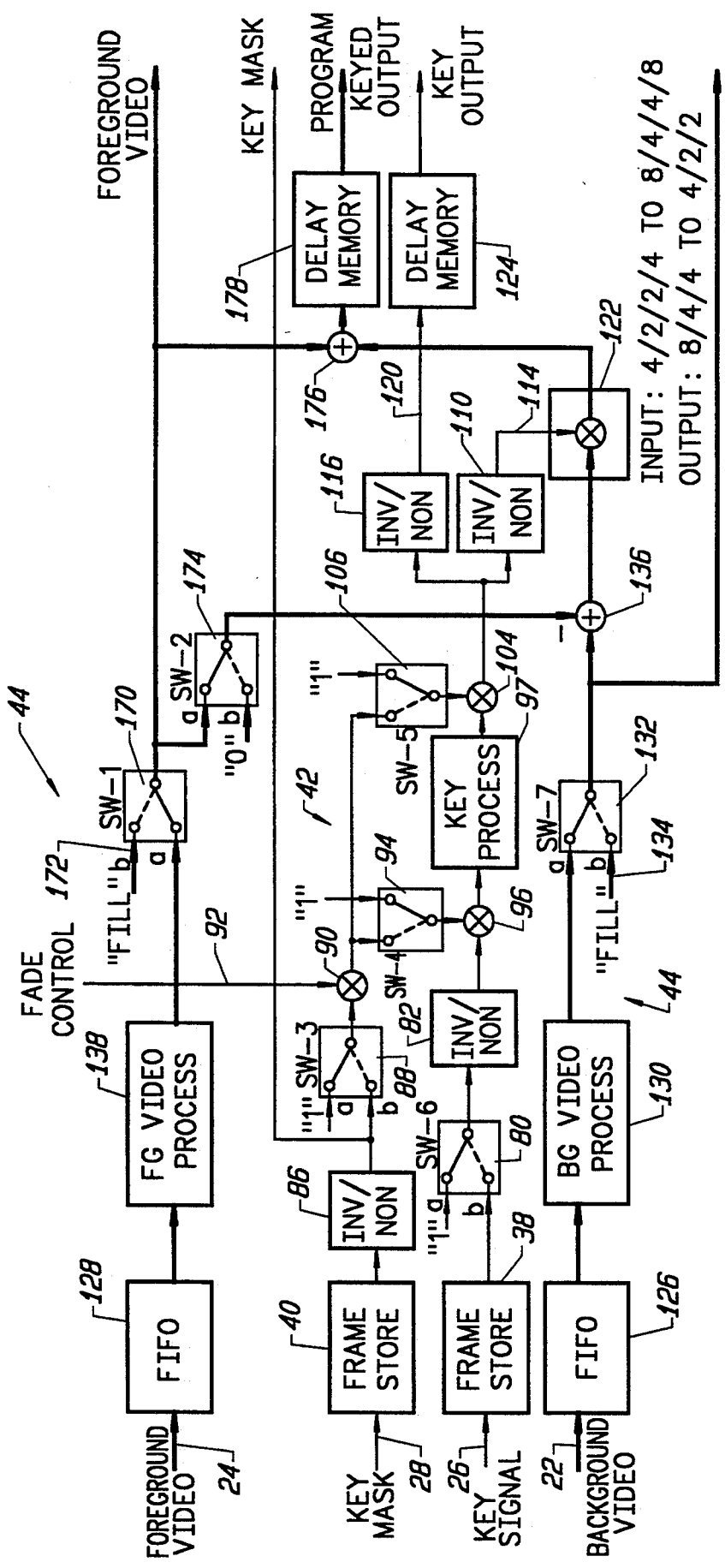
FIG. 8 is a signal flow diagram useful for understanding operation of the digital image compositing system of FIG. 1.

FIG. 8 shows details of the key processing toolkit 42 and the comparator 44 of FIG. 1. The key and mask inputs 26 and 28 are supplied through the frame stores 38 and 40. The output of the frame store 38 is supplied through a key disable/enable switch 80 through a key inversion/noninversion circuit 82. The output of the key inversion/noninversion circuit 82 is supplied to a multiplier 96. The output of the frame store 40 is supplied to a mask inversion/noninversion circuit 86, the output of which is supplied through a mask enable switch 88 to a multiplier 90. The other input 92 to the multiplier 90 is a fade control signal. The output of the multiplier 90 is a processed mask signal, which is supplied through a mask multiplication enable/disable switch 94 to the multiplier 96. In most cases, the processed mask signal is supplied in this path, so that it is used to modify the key signal prior to key signal processing. The output of the multiplier 96 is supplied to a key processing subsystem 97. The output of the key processing subsystem 97 is supplied to a multiplier 104. The multiplier input to the multiplier 104 is the output of a second mask multiplication enable/disable switch 106. The second switch 106 is used to supply the mask input in certain special cases, such as for the generation of drop shadows in an image. Otherwise, the multiplier 104 passes the output of the interpolator 102 unchanged. The output of the multiplier 104 is supplied to an inversion/noninversion circuit 110, the output of which is a processed key signal, which is supplied at 114 to a multiplier 122 for keying. The output of the multiplier 104 is also supplied to an inversion/noninversion circuit 116 for supplying a processed key output at 120 through a delay memory 124, which may or may not be the same as the processed key output at 114.

In the compositor 44, the background and foreground inputs 22 and 24 are supplied to FIFO memories 126 and 128. The output of the FIFO memory 126 is supplied to a background video processing subsystem 130. The output of the video processing subsystem 130 is supplied to a background video/fill select switch 132, which allows user selection of the background video or a fill input 134. The output of the select switch 132 is supplied to a subtracter 136 and as a processed background video output. The output of the FIFO memory 128 is supplied to a foreground video processing subsystem 138, the output of which is supplied to a foreground video/fill select switch 170, which allows user selection of the foreground video or a fill input 172. The output of the select switch 170 is supplied to a non-additive mix (nam) or linear mix/matte select switch 174 and also as a foreground video output. The output of the select switch 174 is supplied to the subtracter 136. The output of the subtracter 136 is supplied to the multiplier 122. The output of the multiplier 122 is supplied to an adder 176, the other input of which is the foreground video output. The output of the adder 176 is supplied through a delay memory 178 as the keyed output program signal.

Figure 9:
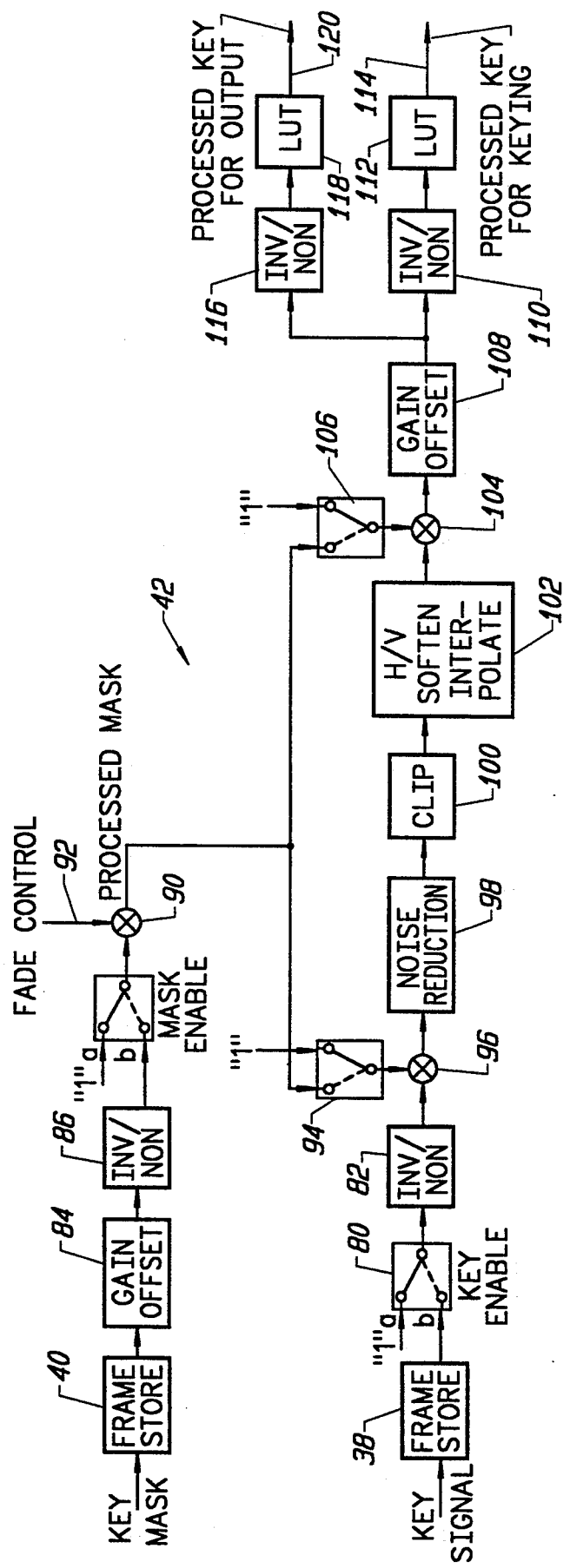
FIG. 9 is a more detailed signal flow diagram of a portion of the signal flow diagram of FIG. 8.

Further details of the key processing toolkit subsystem 42 are shown in FIG. 9. The key mask signal from frame store 40 is supplied through a gain and offset adjustment circuit 84 to the mask inversion/noninversion circuit 86. The output of the key inversion/noninversion circuit 82 is the multiplicand input to the multiplier 96. The output of the multiplier 96 is supplied to a noise reduction filter 98 and then to a clipping circuit 100. The output of the clipping circuit 100 is supplied to a key horizontal/vertical edge softening filter/interpolator 102. The same filter circuit is used with different coefficients for both filters. The filter/interpolator 102 is implemented with a two-dimensional finite impulse response filter. Its structure is modified for two dimensions. For edge softening and interpolation, the same filter structure, driven by different coefficients supplied by the microprocessor, is used. The filter/interpolator 102 may be implemented as a variable bandwidth, low pass filter and interpolator, using multiple TRW TMC 2246 integrated circuits. The output of the interpolator 102 is supplied as a multiplicand to a multiplier 104. The filter 98, clipping circuit 100 and filter/interpolator 102 comprise the key processing subsystem 97. After gain and offset adjustment at 108 and inversion or non-inversion at 110, the key signal is supplied to a look up table selector 112 for supplying the processed key signal at 114 for keying. The key signal may be separately processed for inversion/non-inversion at 116 and supplied to another look up table selector 118 for supply as the separate processed key output at 120.

FIG. 10 represents a simplification of the FIG. 9 subsystem 42 to show the effects of the inversion/non-inversion 82, 86 and 110 or 116 and the multipliers 96 and/or 104. FIGS. 11A–11L show variations of area selections achievable through key and/or mask inversion as a result of the effects produced with the elements shown in FIG. 10. In FIGS. 10 and 11A–11L, the representation x~ means inverted x.

Figure 12A:
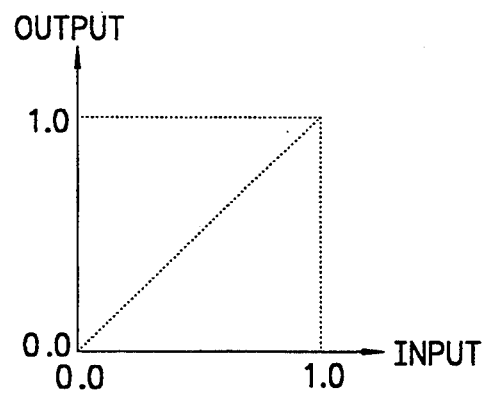
FIGS. 12A–12G are diagrams of input-output characteristics from a portion of the signal flow diagram of FIG. 9.

FIGS. 12A–12G show the results of microprocessor 62 (FIG. 1) control of the clipping filter 100 in FIG. 9. In these figures, the designations shown have the following meanings:

TT: Input top threshold level
TB: Input bottom threshold level
MT: Output top mapped level
MB: Output bottom mapped level
I: Any input
O: Output corresponding to I FIG. 12A represents the Cartesian subspace in which input and output characteristics are defined.

FIGS. 12B–12G represent the input and output characteristics produced in accordance with the following rules:

1. If TT←I then O=MT
2. If I<TT and TB<I then O=I
3. If I<TT and I←TB then O=MB

Figure 12B:
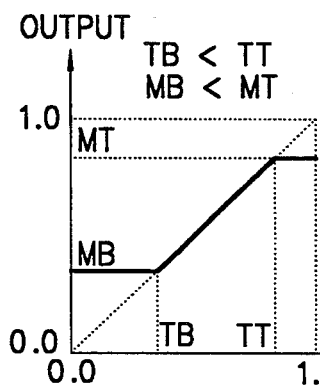
Figure 12C:
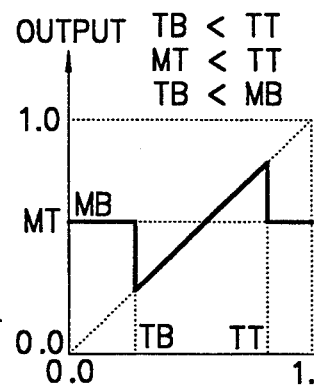
Figure 12D:
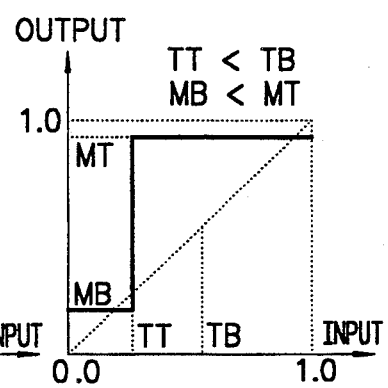
Figure 12E:
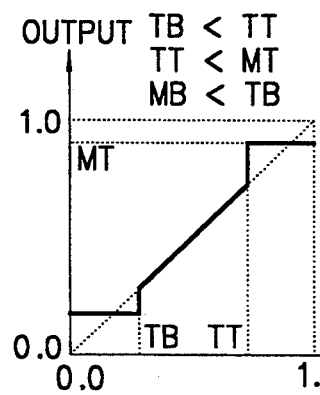
Figure 12F:
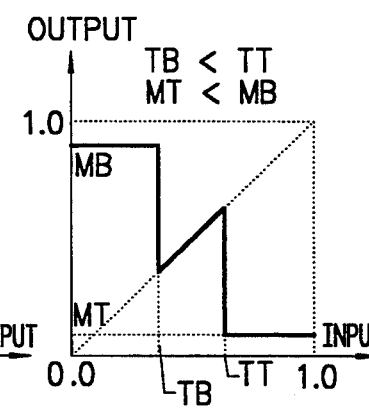
Figure 12G:
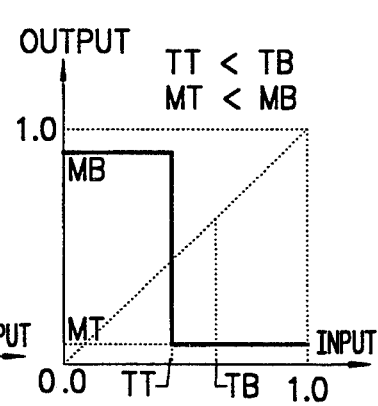

Such flexible clipping of the key signal allows very many different input and output characteristics to be defined. FIG. 12B is a typical example of clipping. FIGS. 12D or 12G are realizable to give a large amount of freedom to the user.

Figure 13:
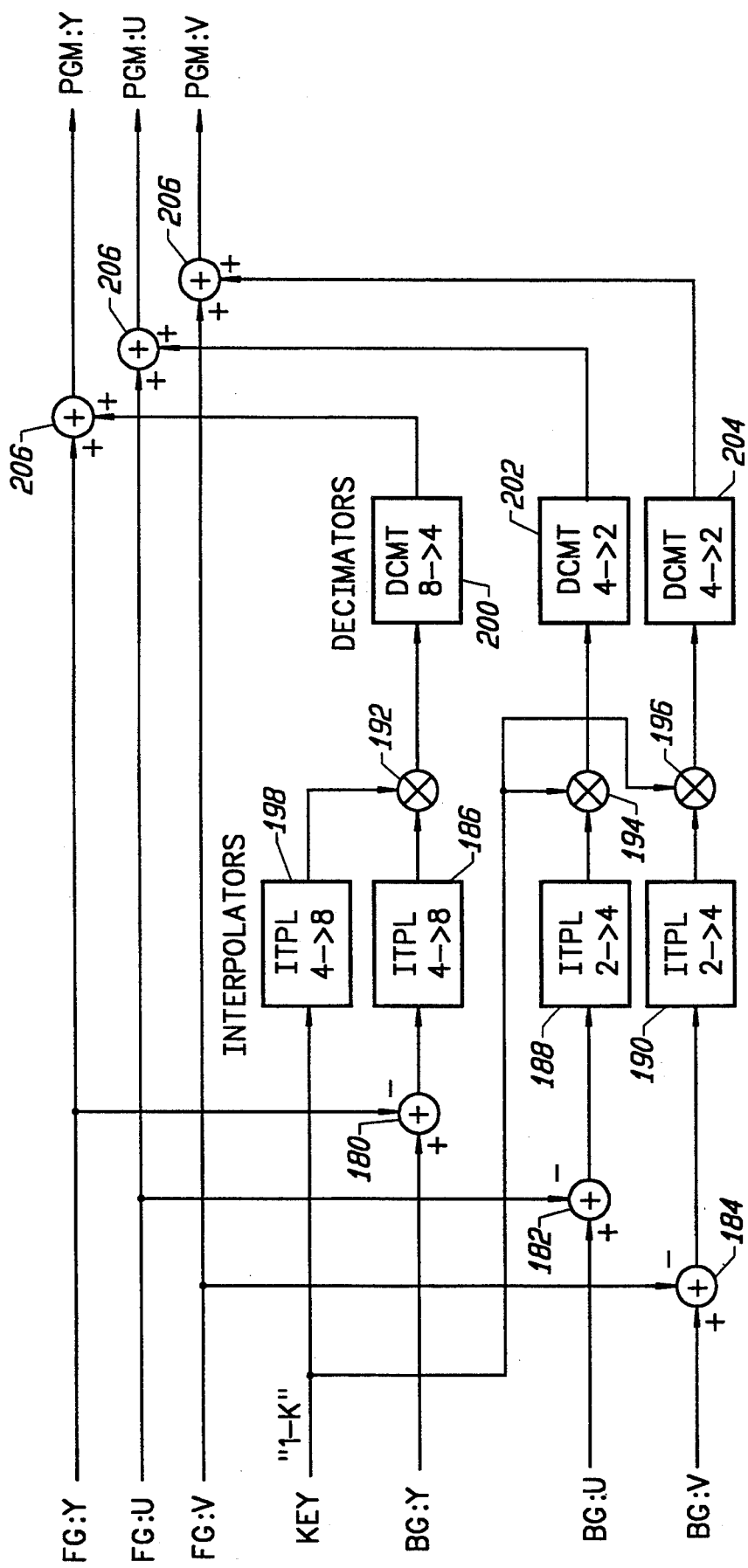
FIG. 13 is a block diagram of another portion of the digital image compositing system of FIG. 1.

FIG. 13 provide further details on the multiplier 122 (FIG. 8) of the compositor 44 and 14A–14B show certain relationships between component video keying and signal frequency spectra, useful for understanding operation of the multiplier 122. Background and foreground component video luminance signals (Y) and chrominance signals (U, V) are supplied to subtracters 180, 182 and 184. The outputs of the subtracters 180, 182 and 184 are respectively supplied to interpolators and frequency doublers 186, 188 and 190. The outputs of the interpolators and frequency doublers 186, 188 and 190 are supplied to multipliers 192, 194 and 196. The key signal is supplied directly to the multipliers 194 and 196 and, through interpolator and frequency doubler 198, to the multiplier 192. The outputs of the multipliers 192, 194 and 196 are supplied through decimators 200, 202 and 204 to summing circuits 206. The three summing circuits 206 correspond to the single summing circuit 176 in FIG. 8. The interpolators and frequency doublers 186, 188, 190 and 198 and the decimators 200, 202 and 204 are implemented with TRW TMC 2242 integrated circuits.

In operation, the multiplier 122 processes the component video signals as follows:

Y component Y:4→Y:8→K:8 * Y:8→LPF→K*Y:4
C (U and V) component C:2→C:4→K:4 * C:4→LPF→K*C:2

Figure 14A:
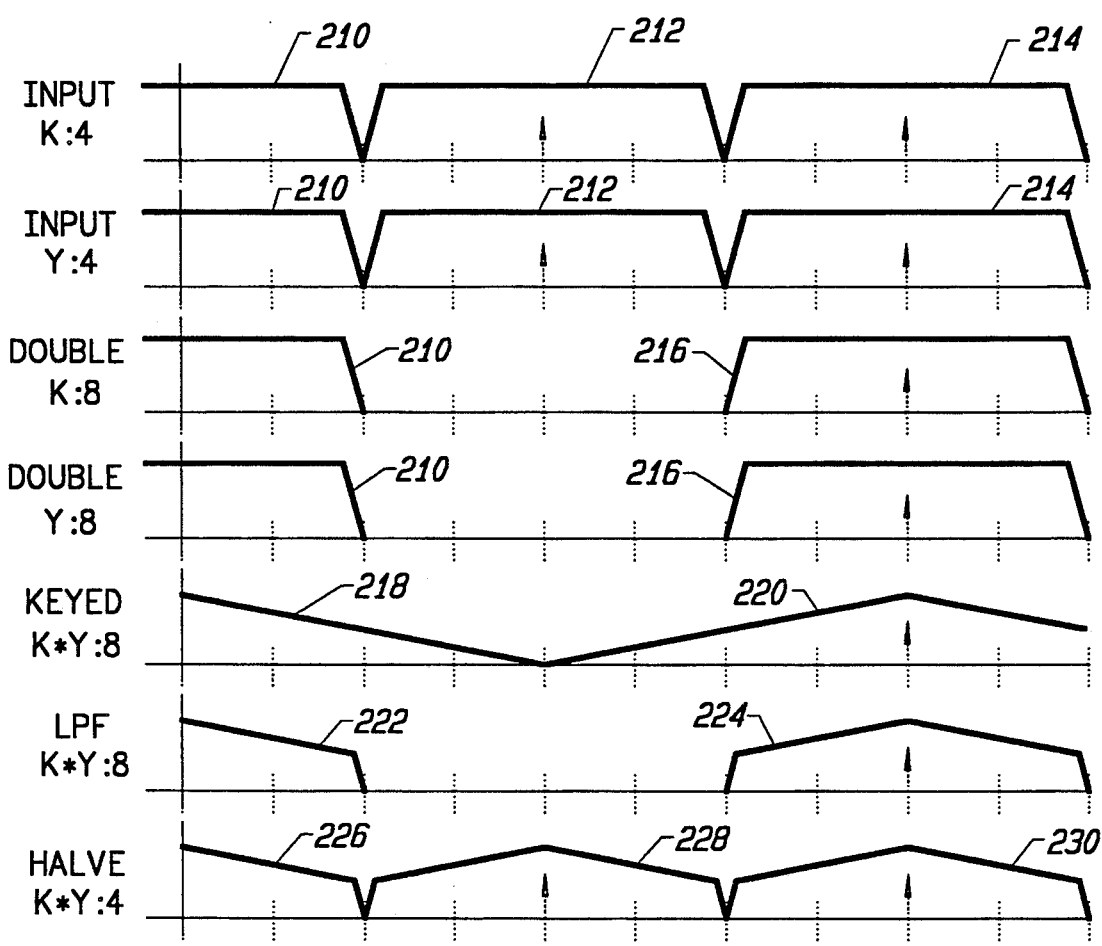
FIGS. 14A–14B are frequency spectra diagrams useful for understanding operation of the system portion of FIG. 13.
Figure 14B:
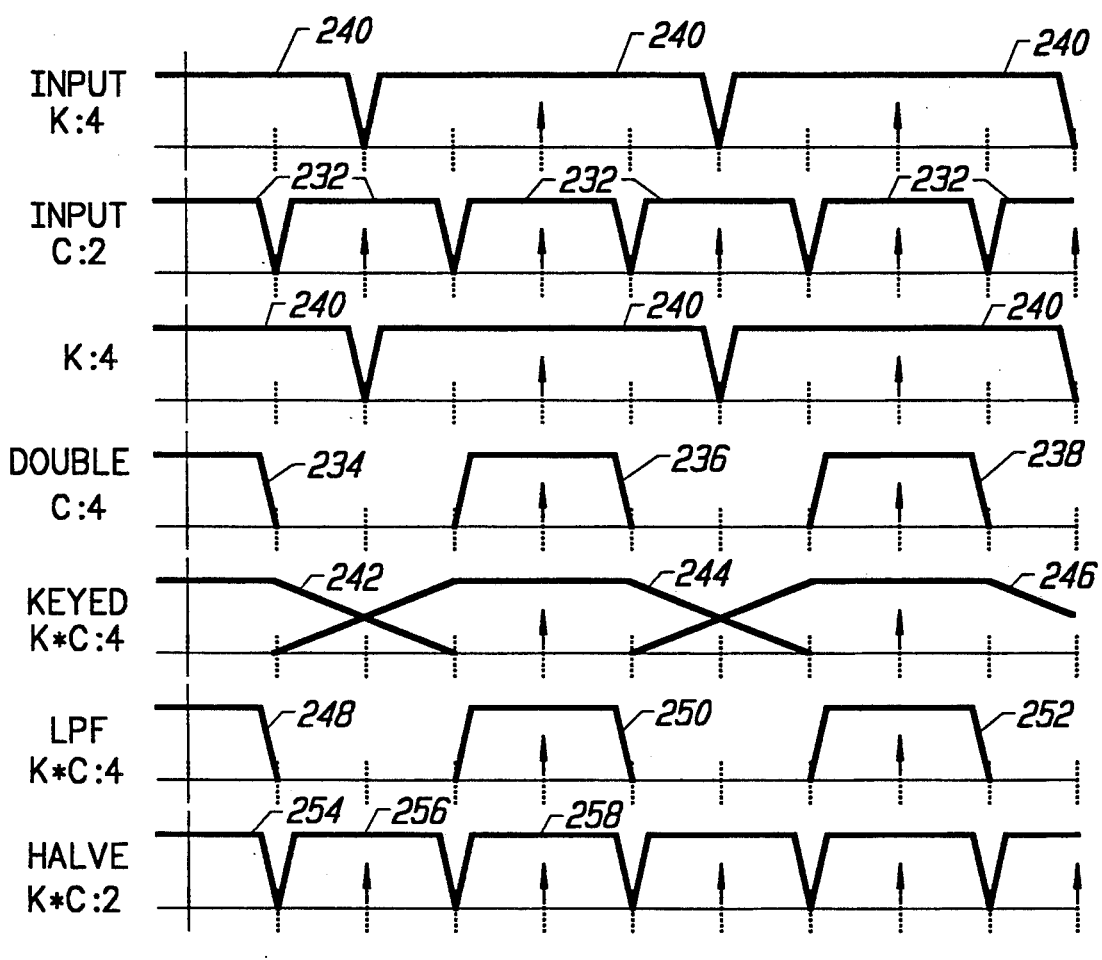

FIGS. 14A and 14B show the signals and their processing. The input K:4 and Y:4 signals show the baseband frequency 210 corresponding to the Nyquist limit of ½ the sampling frequency 212, along with the second harmonic 214 of the sampling frequency 212. The two K and Y input signals have their sampling frequency doubled to give a gap between the baseband frequency 210 and the doubled sampling frequency 216. As a result, spectra overlap between the keyed baseband frequency 218 and the keyed sampling frequency 220 is avoided. The keyed signals are then low pass filtered to give a gap between the low pass filtered baseband frequency 222 and the low pass filtered sampling frequency 224. The low pass filters are part of the decimators 200, 202 and 204. When the frequency of the keyed signals is halved, a clean output of the K*Y:4 baseband frequency 226, sampling frequency 228 and second harmonic 230 of the sampling frequency is obtained. Similarly, with the U and V components, the input C:2 signals 232 are frequency doubled to give gaps between the doubled baseband frequency 234, the doubled sampling frequency 236 and the doubled second harmonic 238 of the sampling frequency 236. However, because the input K:4 signals 240 are not frequency doubled, spectral overlap occurs between the keyed K*C:4 baseband frequency 242, sampling frequency 244 and second harmonic 246 of the sampling frequency. This overlap is not a problem, because the regions of the overlap are eliminated in the low pass filtering to give the low pass filtered K*C:4 baseband frequency 248, sampling frequency 250 and second harmonic 252 of the sampling frequency 250. When the frequency of these signals is halved to give the K*C:2 baseband frequency 254, sampling frequency 256 and second harmonic 258 of the sampling frequency 256, a clean output is also obtained.

Figure 15:
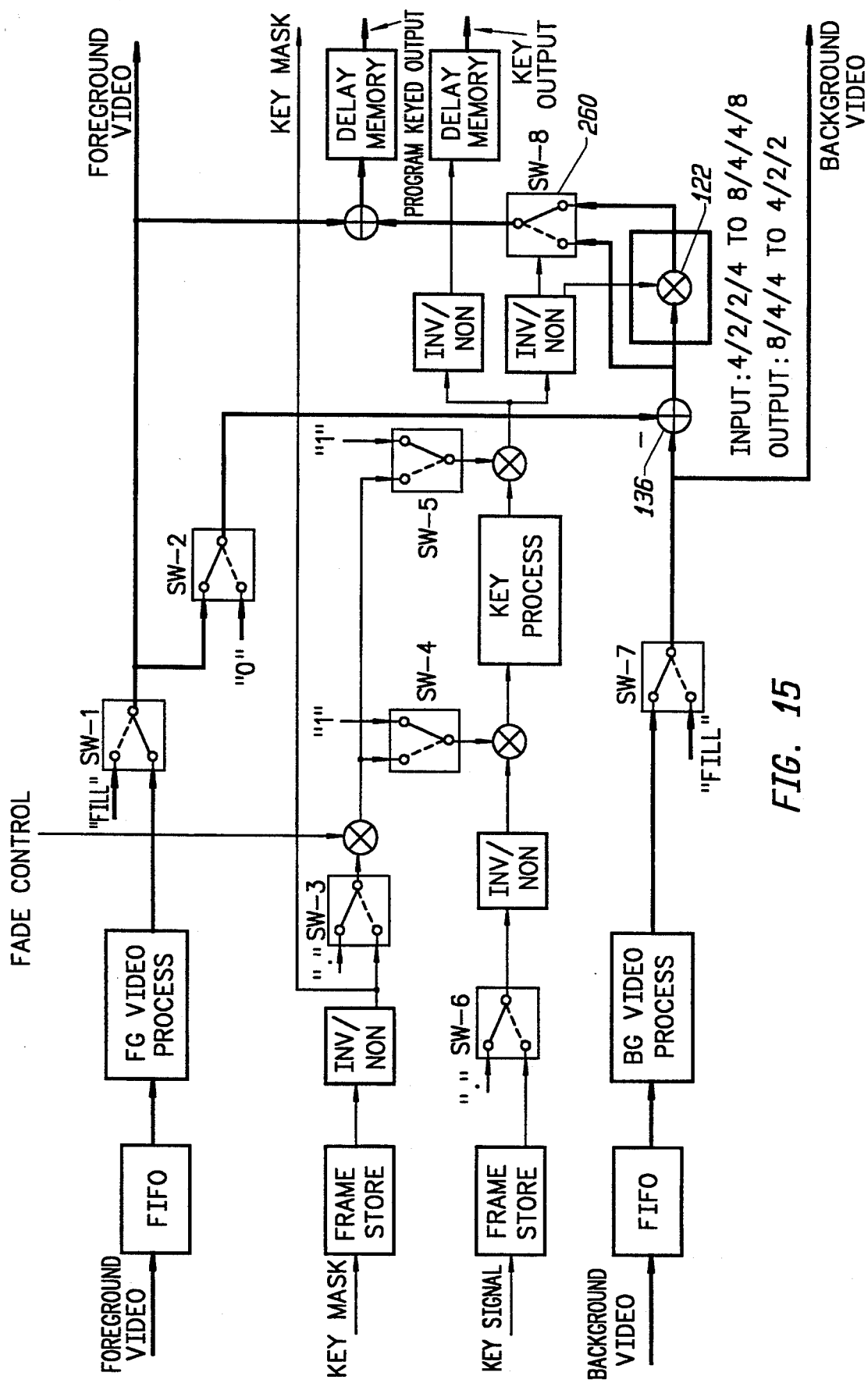
FIG. 15 is a signal flow diagram of another embodiment of the digital image compositing system of FIG. 1.

FIG. 15 shows another form of signal flow for a version of the video compositing system 20 of FIG. 1 in which a switch 260 is provided between the multiplier 122 and the summer 176, to bypass the background—foreground signal from the subtracter 136. The keying multiplier 122, as shown in FIG. 13, uses interpolation and decimation filters to avoid the introduction of aliasing signals. However, such filters inevitably alter signal quality to some extent, and their outputs cannot be identical of the inputs. This impurity of output signal from the keying multiplier 122 causes two problems when 100% background signal is the intended keyed output, i.e.

$$\text{Output} = K * FG + (1 - K) * BG$$
$$= FG + (1 - K) * (BG - FG)$$
when $K = 0$,
$$\text{Output} = FG + 1 * (BG - FG)$$

Because of the filtering involved, 1 * (BG - FG) as the output from the keying multiplier section is not equal to (BG - FG). As a result, the output consists of a slightly impure BG and some residue of FG. By adding a bypass for the (BG - FG) signal for the case when K=0, the signal impurity problem is eliminated. Switch 260 is controlled by K such that select bypassed (BG - FG) if K=0 (nearly equals 0), select keyed (BG - FG) otherwise.

Other than as shown and described, the construction and operation of the FIG. 15 embodiment is the same as that of the FIG. 8 embodiment.

FIG. 16 shows a control panel 220 for the video compositing system 20. The control panel 220 is housed in a single construction and consists of a 8×42 character display 222, with both character and graphics capabilities, four shaft encoders 224, a trackball 226, a keyboard 228 and a buzzer for audio feedback to the user. The system 20 responds in real time to the shaft encoders 224 or key depressions on the keyboard 228.

The keyboard 228 consists of three functionally separate sets of keys, namely, the softkeys 230, the numeric keys 232 and the function keys 234. The row of five softkeys 230 are located immediately below the display panel 222. Their functionality is context dependent, and any softkey 230 may be enabled or disabled for a given display. Consider Table 1.

TABLE 1

| DIGITAL OUTPUT-2 Selection | | | | |
|---|---|---|---|---|
| Output: Composite | | | | |
| CMPST | FG | BG | KEY | MASK |
| 1 | 2 . | 3 | 4 | 5 |

Table 1 represents the state of the control panel during user selection of the Digital Output signal. Here we see that all of the five softkeys 230 have been enabled, and are prompting the user to choose between the signal sources, namely, CMPST—Composite Signal
FG—Foreground Video signal
BG—Background Video signal
KEY—Key signal
MASK—Mask signal.

The user's last choice is displayed in the status line headed "Output:". This format is typical of the interplay between display 222 and softkeys 230. The last line of the display panel is reserved entirely for this purpose. Not every softkey 230 will be enabled as Table 2 serves to demonstrate. In fact the general philosophy of the user interface is to keep every display as simple as possible, so as not to overpower the user.

TABLE 2

| FOREGROUND - STATUS | |
|---|---|
| | Gain = 25% |
| | Offset = 63 IRE |
| Port 2 - serial | Hue = 58 degs |
| | Sat = 13% |
| INPUT | ADJUST |

The appropriate menu for any video compositing system 20 operations is activated by depressing a function key 234. These function keys 234 provide instant access to their respective displays and automatically enable the correct softkeys 230. The function keys 234 are located in a 10×4 matrix just beneath the row of soft keys, and are clearly engraved.

Often, numeric input is required, and this is provided by a 4×4 matrix of numeric keys 232 located to the right of the function keys 234. The numeric keypad consists of the familiar digits 0–9, a sign key, a decimal point, and a clear key.

Numbers entered via the numeric keys 232 are displayed, as soon as they are entered, in the top right corner of the display 222 (assuming that the keypad is enabled) and are enclosed in square brackets. Table 3 shows a display after 0.75 has just been entered. The softkeys 230 are then used to carry this number across to the appropriate entry, for example, [SUB-V] in Table 3.

TABLE 3

| KEY - POSITIONING | [0.75] |
|---|---|
| Sub-Vertical = 0.5 | Sub-Horizontal = 0.75 |
| Vertical = 12 lns | Horizontal = 0 pix |
| [SUB-V] [VERT] | [SUB-H] [HORIZ] |

Often, the user needs to choose the correct numbers for his or her application visually. In other words, the numbers are chosen by observing the changes generated in the output signals of the video compositing system 20. To aid the user in this, four shaft encoders 224 have been provided, and are located in a 2×2 array to the right hand side of the display 222. They are arranged in this manner to coincide with the four variables as shown in Table 3. Namely, the top left encoder 224 corresponds to "Sub-Vertical" entry, the bottom right to "Horizontal" and so on. Values are increased by rotating the shaft encoders 224 in a clockwise direction, and decreased by a counter-clockwise rotation. Their sensitivity is context dependent. As in the case of softkeys 230, not all encoders are enabled for each and every menu (see Table 4).

TABLE 4

| MASK - POSITION | [ ] |
|---|---|
| Vertical = 26 lns | Horizontal = 14 pix |
| [VERT] | [HORIZ] |

The trackball 226 is located to the far right of the numeric key pad and may be used instead of two shaft encoders to control positional input in two planes simultaneously. As before it is only enabled in certain menus. Finally, a buzzer is provided, to warn the user of any attempt to enter incorrect numeric values.

In use of the video compositing system 20, on power up the control panel display 222 shows a simple banner message as shown in Table 5 and awaits user input via the keyboard 228, the four shaft encoders 224 or the trackball 226.

TABLE 5

```
- Accom ICM-4224 -
```

Foreground and Background Input Selection

Selection of foreground and background video is identical. For example, foreground video selection is accomplished by depressing the Foreground Select function key 234. In response to this request the display panel 222 shows the currently active selection, and any auxiliary information pertaining to that selection.

As an example of the foreground signal coming from the first D1 parallel input port see Table 6. Here the luminance gain and offset values are included for the user's convenience, together with the signal's hue and saturation levels. On the bottom display line two softkey prompts, INPUT and ADJUST, are displayed above the first and last softkey buttons 230, which are thereby enabled.

TABLE 6

```
FOREGROUND - STATUS
                              Gain   = 25%
                              Offset = 63 IRE
Port 1 - parallel             Hue    = 92 degs
                              Sat    = 13%
INPUT                         ADJUST
```

Input source selection may be altered by depressing the softkey just below the word INPUT (see Table 7). All five softkeys 230 now become available for the five selections shown at the bottom of Table 7.

TABLE 7

```
FOREGROUND - INPUT
Input: Port 1- parallel
PORT    CONFIG    COLOR    BLACK    TEST
```

Should one wish to change the current input source for any one of the four other D1 input ports, one or more depressions of the PORT softkey 230 are required. The central status line will rotate through them on repeated depressions (see Table 8).

TABLE 8

```
FOREGROUND - INPUT
Input: Port 2- parallel
PORT    CONFIG    COLOR    BLACK    TEST
```

Additionally, either the serial or parallel version of this port may be chosen. The CONFIG button 230 toggles between these two possibilities (see Table 9).

TABLE 9

```
FOREGROUND - INPUT
Input: Port 2- serial
PORT    CONFIG    COLOR    BLACK    TEST
```

Returning the foreground select menu using the Last Menu or Foreground Select button 234 (see Table 6), and selecting the ADJUST softkey, one can modify the luminance and color values (see Table 10).

TABLE 10

```
FOREGROUND - ADJUST                              [ ]
     Lum Gain = 25%              Lum Offset = 63 IRE
     Hue = 92 degs               Saturation = 13%
[GAIN]    [HUE]    [UNITY]    [OFFSET]    [SAT]
```

Typically, numeric values may be changed in either of two ways. By rotating the shaft encoder 224 which bears the same positional relationship to the corresponding display entry, values may be altered incrementally. Alternatively, numbers may be entered with the numeric keys 232. Table 11 shows the display 222 after the number 58 has been entered. Note that it is displayed in the top right corner and is enclosed in square brackets. The square brackets serve to draw a correspondence between the number entered and the (in this case) four possible destinations. These destinations are selected by depressing the appropriate softkeys, which are also enclosed in square brackets.

TABLE 11

```
FOREGROUND - ADJUST                              [58]
     Lum Gain = 25%              Lum Offset = 63 IRE
     Hue = 92 degs               Saturation = 13%
[GAIN]    [HUE]    [UNITY]    [OFFSET]    [SAT]
```

Table 12 shows the result of choosing the softkey [HUE]. The number (58) is transferred to the Hue=XX status entry and the numeric store is automatically cleared.

TABLE 12

```
FOREGROUND - ADJUST                        [ ]

Lum Gain = 25%         Lum Offset = 63 IRE

Hue = 58 degs          Saturation = 13%

[GAIN]     [HUE]    [UNITY]    [OFFSET]    [SAT]
```

Typically the two methods are used together, the keypad to enter coarse values, and the shaft encoders 224 to do fine tuning. On returning to the preceding menu, changes are reflected in the status information (Table 13).

TABLE 13

```
FOREGROUND - STATUS
                              Gain = 25%
                              Offset = 63 IRE
Port 2 - serial
                              Hue = 58 degs
                              Sat = 13%
INPUT                         ADJUST
```

The general philosophy maintained throughout the user interface is to include only those values and prompts which are pertinent to current selection system setup. For example should color fill be selected by a depression of the COLOR softkey 230 (see Table 14), then the display takes on the form of Table 15.

TABLE 14

```
FOREGROUND - INPUT

Input: Port 2- serial

PORT    CONFIG    COLOR    BLACK    TEST
```

TABLE 15

```
FOREGROUND - INPUT

Input: Color

PORT    CONFIG    COLOR    BLACK    TEST
```

Backtracking one level of menu results in a somewhat different display (see Table 16) which should be contrasted with Table 6. Here only those adjustments relevant to Color Fill selection are shown, namely, the red, green and blue components of the fill color, which may be altered in an analogous manner, by selection of the ADJUST softkey 230, and numeric value modification as described above (see Table 17).

TABLE 16

```
FOREGROUND - STATUS
                              R =  98%
Color                         G = 100%
                              B =  32%
INPUT                         ADJUST
```

TABLE 17

```
FOREGROUND - COLOR FILL                    [ ]

Units: RGB                    R = 98%

G = 100%        B = 32%

UNITS    [G]                  [R]    [B]
```

As a further alternative, a change of units is possible through the UNITS softkey 230. The values and units are changed accordingly (see Table 18) and remain the preferred units in status displays until a further units change is requested (see Table 19).

TABLE 18

```
FOREGROUND - COLOR FILL                    [ ]

Units: YUV                    Y = 78%

U = -12%        V = 14%

UNITS    [U]                  [Y]    [V]
```

TABLE 19

```
FOREGROUND - STATUS
                              Y =  78%
Color                         U = -12%
                              V =  14%
INPUT                         ADJUST
```

Black Fill is a further input alternative (see Table 20), which requires no adjustment (see Table 21).

TABLE 20

```
FOREGROUND - INPUT

Input: Black

PORT    CONFIG    COLOR    BLACK    TEST
```

TABLE 21

```
FOREGROUND - STATUS

Black

INPUT
```

Finally, a Test Pattern source is provided, for diagnostic purposes (see Tables 22–23).

TABLE 22

| FOREGROUND - INPUT |
| --- |
| Input: Test |
| PORT    CONFIG    COLOR    BLACK    TEST |

TABLE 23

| FOREGROUND - STATUS | |
| --- | --- |
| | Gain = 25% |
| | Offset = 63 IRE |
| Test | Hue = 58 degs |
| | Sat = 13% |
| INPUT | ADJUST |

Mask Input Selection

The source of the mask input is selected along very similar lines to foreground and background input. From any menu the Mask Select button is depressed resulting in a display as shown in Table 24.

TABLE 24

| MASK - STATUS | | |
| --- | --- | --- |
| Port 4 - parallel | U/V | Normal |
| INPUT    DISABLE    CMPT    POSITION    INVERT | | |

Note that the status display includes additional information as to whether the incoming signal is to be taken from the luminance or chrominance component, and whether this component is to be inverted or not. The source of the mask may be selected from any one of the four D1 inputs 36 (FIG. 1), an analog input, a shape generator or the Test Pattern generator. This is achieved by depressing the INPUT softkey 230 (see Table 25).

TABLE 25

| MASK - INPUT |
| --- |
| Input: Port 4- parallel |
| PORT    CONFIG    ANALOG    SHAPE    TEST |

Selection proceeds as outlined for foreground and background input. Returning to the Mask Selection menu, choice may be made between the Luminance (Y) or Chrominance (U/V) component by toggling the CMPT softkey (see Table 26, Table 27).

TABLE 26

| MASK - STATUS | | |
| --- | --- | --- |
| Port 4 - parallel | Y | Normal |
| INPUT    DISABLE    CMPT    POSITION    INVERT | | |

TABLE 27

| MASK - STATUS | | |
| --- | --- | --- |
| Port 4 - parallel | U/V | Inverted |
| INPUT    DISABLE    CMPT    POSITION    INVERT | | |

The incoming mask signal can be disabled and replaced by a constant source by toggling the DISABLE/ENABLE softkey 230. A display corresponding to Table 28 is obtained for the disable state.

TABLE 28

| MASK - STATUS |
| --- |
| Off |
| ENABLE |

Finally, the mask itself may be repositioned by first selecting the POSITION softkey 230, and then adjusting the horizontal and vertical controls via the shaft encoders 224 or numeric keys 232 in the now familiar way (see Table 29).

TABLE 29

| MASK - POSITION | [ ] |
| --- | --- |
| Vertical = 26 lns | Horizontal = 14 pix |
| [VERT] | [HORIZ] |

Key Input Selection

The source of the key input is selected in the same way as the mask, except for a few refinements. Depress the Key Select button to display a menu very similar to that associated with the Mask Select button (see Table 30).

TABLE 30

| KEY - STATUS | | |
| --- | --- | --- |
| Port 3 - parallel | U/V | Normal |
| INPUT    DISABLE    CMPT    POSITION    INVERT | | |

All softkeys 230 function as for the mask selection case, with the exception of the POSITION softkey 230. As the key signal has the additional feature of permitting subpixel positioning accuracy, a fine tuning control is also supplied. Adjustment is achieved by using the shaft encoders as coarse and fine tuning controls (see Table 31).

TABLE 31

| KEY - POSITIONING | [ ] |
| --- | --- |
| Sub-Vertical = 0.5 | Sub-Horizontal = 0.75 |
| Vertical = 12 lns | Horizontal = 0 pix |
| [SUB-V] [VERT] | [SUB-H] [HORIZ] |

Clip, Gain and Threshold Adjustment

Since adjustment of the clip, gain and threshold characteristics for the key signal are functionally related, the user interface groups these six control elements into two user menus which can be interchanged by a single softkey 230 depression. Tables 32–33 show these two displays. The central softkey 230 THRSHLD or GAIN takes the user from the current display to its complementary one. Note that the Upper and Lower Clip controls are provided on both of the menus for convenience.

TABLE 32

| CLIP & GAIN | | | | [ ] |
|---|---|---|---|---|
| Upper Clip = 100% | | Gain = 106% | | |
| Lower Clip = 14% | | Offset = 15 IRE | | |
| [U-CLP] | [L-CLP] | THRSHD | [GAIN] | [OFFSET] |

TABLE 33

| CLIP & THRESHOLD | | | | [ ] |
|---|---|---|---|---|
| Upper Clip = 100% | | Upper Thrshd = 97% | | |
| Lower Clip = 14% | | Lower Thrshd = 13% | | |
| [U-CLP] | [L-CLP] | GAIN | [U-THR] | [L-THR] |

Composition Control

A single menu has been dedicated to composition control. Numerous effects can be realized by the video composition system 20, through the control of the mask and key signals. Manipulation of the foreground and background video, color fills or black to generate matte, mix, fades etc. is easily achieved.

The Composition Control button leads one to the control menu as shown in Table 34. Each softkey 230 on this menu toggles between the alternative entries, except for the [FADE].

TABLE 34

| SYSTEM - CONTROL | | | | [ ] |
|---|---|---|---|---|
| Normal | Normal | On | Off | 78% |
| KEY | MASK | BEFORE | AFTER | [FADE] |

As an example, consider the key itself. Repeated depressions of the KEY softkey 230 cycles one through the three alternatives, namely, Normal, Inverted and Off (see Tables 34–36). The MASK softkey 230 performs an identical function for the mask signal.

TABLE 35

| SYSTEM - CONTROL | | | | [ ] |
|---|---|---|---|---|
| Inverted | Normal | On | Off | 78% |
| KEY | MASK | BEFORE | AFTER | [FADE] |

TABLE 36

| SYSTEM - CONTROL | | | | [ ] |
|---|---|---|---|---|
| Off | Normal | On | Off | 78% |
| KEY | MASK | BEFORE | AFTER | [FADE] |

One of the design elements which enables the video compositing system 20 to achieve such a wide range of compositional effects is it's ability to channel the action of the net key signal into both pre and post "key-process" phases. The enabling/disabling of these two controls are provided through the BEFORE and AFTER softkeys 230, which alternate between the On and Off status.

The percentage of mix between the foreground and background is controlled through the [FADE] softkey 230 via numeric key 232 entry, or the relevant shaft encoder 224. In addition to this "analog" mode of entry, the Cut button 234 alternates the Fade level between 0% and 100% (see Tables 37–38).

TABLE 37

| SYSTEM - CONTROL | | | | [ ] |
|---|---|---|---|---|
| Normal | Normal | On | Off | 100% |
| KEY | MASK | BEFORE | AFTER | [FADE] |

TABLE 38

| SYSTEM - CONTROL | | | | [ ] |
|---|---|---|---|---|
| Normal | Normal | On | Off | 0% |
| KEY | MASK | BEFORE | AFTER | [FADE] |

Coring and Softening

The key signal may be further modified by coring and softening. These controls are accessed by the Coring and Softening button 234. In essence the coring level selects a low pass filter profile. In addition the horizontal and vertical edges of the key shape may be softened through the two controls provided (see Table 39).

TABLE 39

| CORING & SOFTENING | [ ] |
|---|---|
| Vertical = 0 | Coring Level = 0<br>Horizontal = 0 |
| [VERT] | [CORE] [HORIZ] |

Transition Control

Transitions are controlled by specifying a transition profile and a duration. These are accessed by depressing the Auto Transition button 234 to give the display shown in Table 40. As before, both numeric keys 232 and shaft encoders 224 may be employed for data input (see Table 40).

TABLE 40

```
AUTO - TRANSITION                    [ ]
Profile = 4           Duration = 120 frames
    [PROF]                       [DUR]
```

Output Timing

The fully composed "composite" video, and the processed key signal both have an output timing control which may be reached by a depression of the Output Timing button 234. Selection is a two stage process. The first menu to be displayed is shown in Table 41. From here one chooses either the KEY or CMPST softkey 230, to give displays indicated in Tables 42 and 43 respectively.

TABLE 41

```
OUTPUT TIMING

KEY     CMPST
```

TABLE 42

```
OUTPUT TIMING - KEY                  [ ]
Vertical = 2 lns      Horizontal = 3 pix
KEY     CMPST         [VERT]    [HORIZ]
```

TABLE 43

```
OUTPUT TIMING - COMPOSITE            [ ]
Vertical = 6 lns      Horizontal = 5 pix
KEY     CMPST         [VERT]    [HORIZ]
```

Digital Output-2 Selection

The video compositing system 20 provides five digital output choices from "composite", foreground, background, key and mask signals. Selection is made by first depressing the Digital-2 Output selection button 234 and then the softkey 230 corresponding to signal required (see Table 44)

TABLE 44

```
DIGITAL OUTPUT-2 Selection
Output: Composite
CMPST   FG    BG    KEY    MASK
```

Analog Output Selection

An analog output is provided to monitor the outgoing signals. Choices are made via the Analog Output button 234 in the same way as for Digital-2 Output selection.

TABLE 45

```
ANALOG OUTPUT Selection
Output: Composite
CMPST   FG    BG    KEY    MASK
```

Attached as an appendix hereto and forming a part of this application is a source code listing in the C programming language of control programs for the microprocessor controller 62 (FIG. 1). These programs control all of the hardware elements shown in the detailed block diagrams of FIGS. 8, 9, 13 and 15, communications with the control panel of FIG. 16 and communications with other systems, such as video editors, connected to the system 20. The software also provides the menus shown above in Tables 1-45.

In practice, the digital image compositing system of this invention is a component digital single-layer high accuracy compositing module that can stand alone or be an integral part of a large system. New techniques for combining layers provide a level of compositing performance and quality that has never been achieved before. The system can be used for all D1 compositing applications as well as be the center of a very cost effective D1 editing suite. The system provides advanced capabilities in layering performance. New digital processing techniques preserve foreground and background edge detail, thereby achieving unsurpassed layering realism.

The system is easily integrated into digital and analog component systems where digital component editing is required. It can be the center of new D1 editing and compositing suites by replacing more costly D1 switchers. For graphics applications, it provides real-time layering at a lower price than alternative means. In telecine, the system replaces a switcher for preview or production compositing while pulling mattes.

Both linear and matte keying is provided. Matte keying simulates the optical matte process which leaves the edges of the foreground video unprocessed, thereby preserving the foreground's edge detail.

The system can be controlled through RS-422 and GPI ports. Serial RS-422 ports allow an external device to emulate the system's control panel and allow the system to be controlled as if it were a Grass Valley Group 100 series switcher. The functions of the GPIs can be assigned by the operator.

The system can be controlled using an internal time line. Events which are assigned to the system's time line are automatically initiated and can be stepped through on a field-by-field basis. The time line can be programmed from the control panel or by an external controller.

Even though the system is a single-layer module, it can be combined with additional systems to do parallel multi-layering. The delay through a single system is exactly one frame. When cascaded, the delay through each system is adjusted to maintain one frame delay through the completed cascaded array.

A complete kit of tools is provided to modify the key signal. H and V position is adjustable in sub-pixel increments to match key to foreground. To improve the transitions between foreground and background, adjustable H and V edge softening is provided. Upper and lower clip points can be set over the complete range of the key signal to adjust the keying effect. Used with the clip points, wide-range gain and offset adjustments also provide a powerful way to adjust the look of the keying process. To smooth edges from analog keys, noise reduction is available. Inversion of the key and mask is also provided.

Full adjustment of foreground and background parameters is provided, including luminance gain and offset and chrominance saturation and hue rotation.

Timed events are provided for transitions between sources. These include cuts and dissolves between foreground, background and fill. Also, keys can be faded up or down. The foreground and background fill can be adjusted and programmed in RGB and YUV values.

The system operates in both 525 and 625 4:2:2 standards. Selection is automatic or can be manually set by the operator.

Keyboard macros can be programmed and assigned to the time line or GPIs.

An analog luminance input is provided to accept analog key and mask sources. This input is converted to 10 bit 4:0:0 and is connectable to the internal key and mask busses through key and mask frame stores. A full quality 10 bit RGB, YUV or Betacam output is provided for monitoring and recording on analog VTRs.

It should now be readily apparent to those skilled in the art that a novel digital image compositing system and method capable of achieving the stated objects of the invention has been provided. The digital image compositing system and method incorporates flexible input and output crosspoint switching. Digital inputs and outputs are provided for all video signals. The digital image compositing system and method will accept analog key or mask input signals. The digital image compositing system and method will additionally provide any output video signal in analog form. The digital image compositing system and method can be cascaded to provide real time multiple layer compositing. The digital image compositing system and method incorporates a user interface that facilitates use of the flexibility provided by the system and method.

It should further be apparent to those skilled in the art that various changes in form and details of the invention as shown and described may be made. It is intended that such changes be included within the spirit and scope of the claims appended hereto.

What is claimed is:

1. A digital image compositing system comprising:
   a plurality of digital video signal inputs;
   a key signal processing system;
   a video image compositor;
   a first plurality of crosspoint switches, coupling said plurality of digital video signal inputs to said key signal processing system and to said video image compositor;
   a key input coupled through said plurality of crosspoint switches to said key signal processing system;
   a plurality of digital video signal outputs; and
   a second plurality of crosspoint switches, coupling said key signal processing system and said video image compositor to said plurality of digital video signal outputs;
   wherein said key signal processing system has at least one characteristic selected from the group consisting of:
   (i) said key signal processing system includes a look-up table containing a plurality of user-selectable look-up table input/output characteristics, said key signal processing system being configured to allow selection of different look-up table input/output characteristics for a television frame to provide different outputs for different portions of the television frame;
   (ii) said key signal processing system is configured to provide user-selectable randomized rounding of fractional values of the digital video signals to integers over different ranges of fractional values, with fractional values outside said different ranges being rounded to a closest digit;
   (iii) said key signal processing system includes a microprocessor-controllable clipping circuit that selects from a plurality of different clipping characteristics;
   (iv) said key signal processing system includes a microprocessor-controllable clipping circuit, responsive to a user selection, that selects from a plurality of different clipping characteristics;
   (vi) said key signal processing system includes a microprocessor-controlled edge softening filter/interpolating circuit for edge blending of a key signal supplied to said key input;
   (vii) said key signal processing system includes a microprocessor-controlled two-dimensional finite impulse response filter for edge blending of a key signal supplied to said key input;
   (vii) said key signal processing system and said video image compositor are configured to provide user selectable randomized rounding of fractional values of digital video signals to integers over different ranges of fractional values, with fractional values outside said different ranges being rounded to a closest digit;
   (viii) said key signal processing system includes a look-up table containing a plurality of look-up table input/output characteristics, and means controlling said look up table to allow selection of different look-up table input/output characteristics for a television frame to provide different outputs for different portions of the television frame; and
   (ix) said key signal processing system includes a look-up table containing a plurality of look-up table input/output characteristics, and user-selected means controlling said look-up table for allowing user selection of different look-up table input/output characteristics.

2. The digital video image compositing system of claim 1, further including a control microprocessor coupled to said key signal processing system, said video image compositor, said first plurality of crosspoint switches, and said second plurality of crosspoint switches.

3. The digital video image compositing system of claim 2, further including a keyboard and display coupled to said key signal processing system and to said video image compositor through said microprocessor to provide real time response to inputs through said keyboard, wherein said keyboard has at least one characteristic selected from the group consisting of:
   (i) said keyboard includes a plurality of function keys, a plurality of numeric keys, and a plurality of shaft encoders;
   (ii) said keyboard includes a plurality of soft keys having software definable functions, said plurality of soft keys being positioned on said keyboard below said display, so that functions of said soft keys defined by software are displayed adjacent each of said plurality of soft keys; and (iii) said keyboard additionally includes a trackball.

4. The digital video image compositing system of claim 1, further including a mask input coupled by said first plurality of crosspoint switches to said key signal processing system, a fade control input in said key signal processing system being coupled to modify a mask input signal from said mask input to produce a modified mask input signal that is coupled to modify a key input signal from said key input.

5. The digital video image compositing system of claim 4, wherein said modified mask input signal is coupled to selectively modify said key input signal before and after processing of said key input signal by said key signal processing system.

6. The digital video image compositing system of claim 5, further including a selectively operable inversion circuit having at least one characteristic selected from the group consisting of:
   (i) said circuit is coupled between said key input and said key signal processing system;
   (ii) said circuit is coupled between said key signal processing system and said video image compositor;
   (iii) said circuit is coupled between said key signal processing system and a key output provided in said digital video image compositing system; and
   (iv) said circuit is coupled between said mask input and said key signal processing system, said circuit operating selectively upon user control.

7. The digital video image compositing system of claim 1, further including frame store means for storing, said frame store means having at least one characteristic selected from the group consisting of:
   (i) said means includes at least one frame store coupled between said first plurality of crosspoint switches and said key signal processing system;
   (ii) said means includes at least one frame store coupled between said key input and said first plurality of crosspoint switches; and
   (iii) said means includes a frame store comprising a mask input coupled by said first plurality of crosspoint switches to said key signal processing system.

8. A digital image compositing system comprising:
a plurality of digital video signal inputs;
a key signal processing system;
a video image compositor;
a first plurality of crosspoint switches, coupling said plurality of digital video signal inputs to said key signal processing system and to said video image compositor;
a key input coupled through said plurality of crosspoint switches to said key signal processing system;
a plurality of digital video signal outputs; and
a second plurality of crosspoint switches, coupling said key signal processing system and said video image compositor to said plurality of digital video signal outputs; wherein said video image compositor has at least one characteristic selected from the group consisting of:
   (i) said video image compositor is configured to provide user selectable randomized rounding of fractional values of digital video signals to integers over different ranges of fractional values, with fractional values outside said different ranges being rounded to a closest digit; and
   (ii) said video image compositor and said key signal processing system are configured to provide user selectable randomized rounding of fractional values of digital video signals to integers over different ranges of fractional values, with fractional values outside said different ranges being rounded to a closest digit.

9. The digital video image compositing system of claim 8, further including a mask input coupled by said first plurality of crosspoint switches to said key signal processing system, a fade control input in said key signal processing system being coupled to modify a mask input signal from said mask input to produce a modified mask input signal, said modified mask input signal being coupled to modify a key input signal from said key input.

10. The digital video image compositing system of claim 9, wherein said modified mask input signal is coupled for selectively modifying said key input signal before and after processing of said key input signal by said key signal processing system.

11. The digital video image compositing system of claim 10, wherein said digital video image compositing system includes a selectively operable inversion circuit having at least one characteristic selected from the group consisting of:
   (i) said circuit is coupled between said key input and said key signal processing system;
   (ii) said circuit is coupled between said key signal processing system and said video image compositor;
   (iii) said circuit is coupled between said key signal processing system and a key output provided by said digital video imaging compositing system; and
   (iv) said circuit is coupled between said mask input and said key signal processing system.

12. The digital video image compositing system of claim 11, wherein said key signal processing system includes at least one characteristic selected from the group consisting of:
   (i) said key signal processing system includes a microprocessor-controllable clipping circuit that can select from a plurality of different clipping characteristics in response to a user selection;
   (ii) said key signal processing system includes a microprocessor-controlled edge softening filter/interpolating circuit for edge blending of a key signal supplied to said key input;
   (iii) said key signal processing system includes a microprocessor-controlled two-dimensional finite impulse response filter for edge blending of a key signal supplied to said key input; and
   (iv) said key signal processing system includes a microprocessor-controlled edge softening filter/interpolating circuit for edge blending of a key signal supplied to said key input, wherein edge blending occurs under user control.

13. The digital video image compositing system of claim 12, further including frame store means for storing, said frame store means having at least one characteristic selected from the group consisting of:
   (i) said means includes at least one frame store coupled between said first plurality of crosspoint switches and said key signal processing system;
   (ii) said means includes at least one frame store coupled between said key input and said first plurality of crosspoint switches; and
   (iii) said means includes a frame store comprising a mask input coupled by said first plurality of crosspoint switches to said key signal processing system.

14. A digital image compositing method comprising the following steps:

selectively providing a plurality of digital video input signals including a key signal to a key signal processing means and to a video image compositor;

processing said selected plurality of digital video input signals in said key signal processing means and processing said selected plurality of the digital video input signals in said video image compositor; and selectively providing a plurality of processed digital video output signals from said key signal processing means and from said video image compositor;

said method including at least one set of steps selected from the group consisting of:

(i) sub-pixel positioning by interpolation for edge blending the key signal;

(ii) selecting different look-up table input/output characteristics for a television frame to provide different outputs for different portions of said television frame;

(iii) processing said selected plurality of digital video input signals in said video image compositor including selecting randomized rounding of fractional values of digital video signals to integers over different ranges of fractional values, with fractional values outside said different ranges being rounded to a closest digit;

(iv) providing a key signal, a mask signal, and a fade control signal to said key signal processing means, processing said key signal in said key signal processing means, modifying said mask signal using said fade control signal to provide a modified mask signal, and selectively using said modified mask signal to modify said key signal before and after processing of said key input signal; and (v) selectively inverting said key signal before supplying said key signal to said key signal processing means to give a selectively inverted key signal, and forming a modified key signal by processing said selectively inverted key signal in said key signal processing means.

* * * * *